(12) United States Patent
Lee et al.

(10) Patent No.: US 11,991,024 B2
(45) Date of Patent: May 21, 2024

(54) TRANSMITTING AND RECEIVING METHOD IN 1-BIT QUANTIZATION SYSTEM AND APPARATUS THEREFOR

(71) Applicant: LG ELECTRONICS INC., Seoul (KR)

(72) Inventors: Sangrim Lee, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/624,202

(22) PCT Filed: Jul. 3, 2019

(86) PCT No.: PCT/KR2019/008142
§ 371 (c)(1),
(2) Date: Dec. 30, 2021

(87) PCT Pub. No.: WO2021/002507
PCT Pub. Date: Jan. 7, 2021

(65) Prior Publication Data
US 2022/0360473 A1 Nov. 10, 2022

(51) Int. Cl.
*H04L 25/02* (2006.01)
*H04B 7/0413* (2017.01)
*H04B 17/30* (2015.01)
*H04L 1/20* (2006.01)
*H04L 25/49* (2006.01)
*H04L 27/22* (2006.01)

(52) U.S. Cl.
CPC ....... *H04L 25/0226* (2013.01); *H04B 7/0413* (2013.01); *H04B 17/30* (2015.01); *H04L 1/20* (2013.01); *H04L 25/49* (2013.01); *H04L 27/22* (2013.01)

(58) Field of Classification Search
CPC ..... H04L 25/0226; H04L 27/18; H04L 27/22; H04L 27/233; H04B 7/0413; H04B 7/08
See application file for complete search history.

(56) References Cited

U.S. PATENT DOCUMENTS

| | | | |
|---|---|---|---|
| 6,487,255 B1 | 11/2002 | Arslan et al. | |
| 8,873,609 B2 * | 10/2014 | Ezaki | H04L 25/0222 375/279 |
| 2011/0222590 A1 | 9/2011 | Dick | |
| 2017/0134120 A1 | 5/2017 | Calabro | |
| 2018/0331710 A1 | 11/2018 | Lovberg et al. | |

FOREIGN PATENT DOCUMENTS

JP 2001-285164 A 10/2001

\* cited by examiner

*Primary Examiner* — Betsy Deppe
(74) *Attorney, Agent, or Firm* — BRYAN CAVE LEIGHTON PAISNER LLP

(57) ABSTRACT

A method for transmitting and receiving a signal in a wireless communication system and an apparatus therefor are disclosed in the present disclosure. Specifically, a method for transmitting and receiving a signal by a receiving apparatus in a wireless communication system, according to an embodiment of the present disclosure, may comprise the steps of: continuously receiving a plurality of reference signals from a transmitting apparatus; sorting the ranges of channel phases on the basis of the plurality of reference signals; grouping the ranges of the channel phases into two or more groups; and receiving a data signal from the transmitting apparatus.

6 Claims, 25 Drawing Sheets consecutive known RSs    Data part    e.g., symbol structurere

TRANSMITTING AND RECEIVING METHOD IN 1-BIT QUANTIZATION SYSTEM AND APPARATUS THEREFOR

CROSS-REFERENCE TO RELATED APPLICATIONS

This application is the National Stage filing under 35 U.S.C. § 371 of International Application No. PCT/KR2019/008142, filed on Jul. 3, 2019, all of which are incorporated by reference in its entirety herein.

TECHNICAL FIELD

The present disclosure relates to a wireless communication system, and more particularly, to a transmitting and receiving method in a communication system based on 1-bit quantization (quantization) and an apparatus supporting the same.

BACKGROUND ART

Mobile communication systems have been developed to provide voice services, while ensuring the activities of users. However, coverage of the mobile communication systems has extended up to data services, as well as voice service. Today, an explosive increase in traffic has caused the shortage of resources. There is a need for an advanced mobile communication system because users want relatively high speed services.

Requirements for a next-generation mobile communication system include the accommodation of explosive data traffic, a significant increase in the transfer rate per user, the accommodation of a greatly increased number of connection devices, very low end-to-end latency, and high energy efficiency. To this end, various technologies, such as dual connectivity, massive multiple input multiple output (MIMO), in-band full duplex, non-orthogonal multiple access (NOMA), super wideband, and device networking, are researched.

DISCLOSURE

Technical Problem

The present disclosure proposes a method of transmitting and receiving a signal based on 1-bit quantization considering energy efficiency.

Specifically, the present disclosure proposes a data transmitting and receiving method and a channel quality measurement method using a 1-bit differential phase shift modulation and demodulation technique based on a single carrier.

In addition, the present disclosure proposes a link adaptive transmission/reception technique using the measured channel quality.

In addition, the present disclosure proposes a spatially aggregated phase modulation (SAPM) technique based on 1-bit quantization to expand the number of data bits that can be processed.

Technical tasks to be achieved in the present disclosure are not limited to the technical tasks mentioned above, and other technical tasks not mentioned will be clearly understood by those with ordinary knowledge in the technical field to which the present disclosure belongs from the description below.

Technical Solution

According to an embodiment of the present disclosure, there is provided a method for transmitting and receiving a signal by a receiving apparatus in a wireless communication system, the method including: continuously receiving a plurality of reference signals from a transmitting apparatus; sorting a range of a channel phase on the basis of the plurality of reference signals; grouping the range of the channel phases into two or more groups; and receiving a data signal from the transmitting apparatus.

In the method according to the embodiment of the present disclosure, the plurality of reference signals may be configured by rotating at regular intervals based on an arbitrary reference signal.

In the method according to the embodiment of the present disclosure, the regular interval may be related to the number of bits of the data signal.

In the method according to the embodiment of the present disclosure, the regular interval may be set such that a change of one bit has a maximum distance.

In the method according to the embodiment of the present disclosure, the arbitrary reference signal may be preset between the transmitting apparatus and the receiving apparatus.

In the method according to the embodiment of the present disclosure, a range of the channel phase may be sorted according to how much a phase rotation of the plurality of reference signals is received compared to an original signal.

In the method according to the embodiment of the present disclosure, each group of the two or more groups may include a range of four channel phases.

In the method according to the embodiment of the present disclosure, the method may further include decoding the data signal.

In the method according to the embodiment of the present disclosure, the data signal may be decoded based on the selection and combination of the range of each one channel phase in each group of the two or more groups.

In the method according to the embodiment of the present disclosure, the method may further include transmitting the corresponding information to the transmitting apparatus when one channel phase range is not selected from each group of the two or more groups.

In the method according to the embodiment of the present disclosure, the data signal may correspond to a signal of three or more bits sorted based on a phase rotation.

According to an embodiment of the present disclosure, there is provided an apparatus for transmitting and receiving a signal in a wireless communication system, in which a receiving apparatus includes a radio frequency (RF) unit configured to transmit or receive a radio signal, and a processor operatively connected to the RF unit, and the processor controls the RF unit to continuously receive a plurality of reference signals from a transmitting apparatus, sorts a range of a channel phase based on the plurality of reference signals, forms two or more groups by grouping the range of the channel phase, and controls the RF unit to receive a data signal from the transmitting apparatus.

In the apparatus of the embodiment of the present disclosure, the processor may group the range of the channel phase in units of four to perform control to configure the two or more groups.

In the apparatus of the embodiment of the present disclosure, the processor may perform decoding of the data signal.

In the apparatus of the embodiment of the present disclosure, the processor may decode the data signal based on the selection and combination of the range of each one channel phase in each group of the two or more groups.

Advantageous Effects

According to an embodiment of the present disclosure, it is possible to improve the power consumption of the system through the transmitting and receiving method based on 1-bit quantization.

According to an embodiment of the present disclosure, it is possible to process data of a larger number of bits while being based on the 1-bit quantization.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

MODE FOR DISCLOSURE

Figure 1:
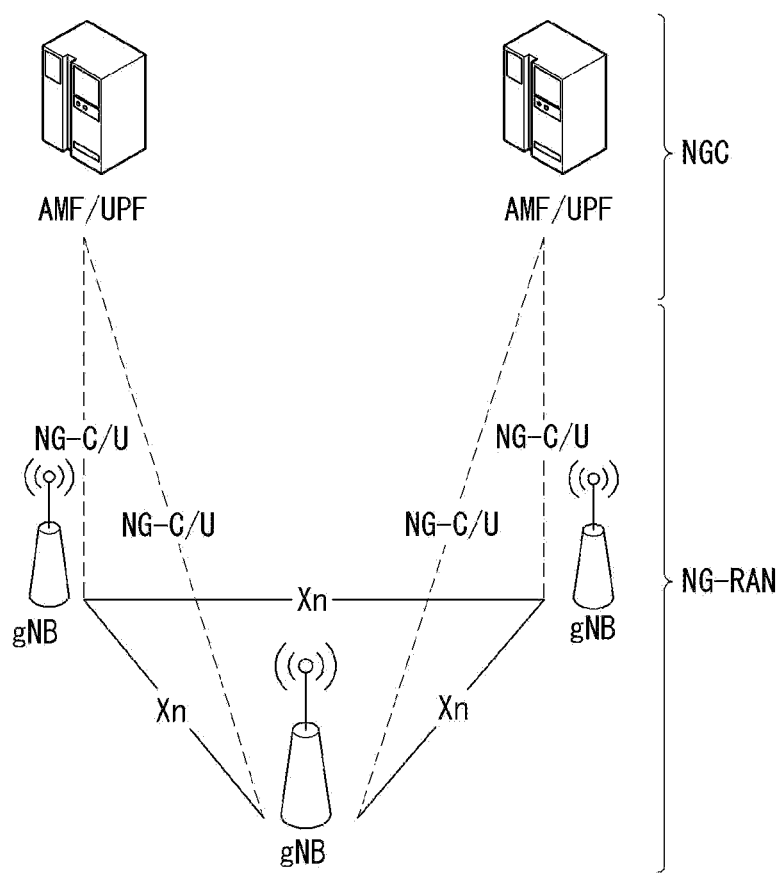
FIG. 1 is a diagram illustrating an example of an overall system structure of NR to which a method proposed in the disclosure may be applied.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an Artificial Intelligence (AI) module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself.

Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

FIG. 1 illustrates an example of an overall structure of a new radio (NR) system to which a method proposed by the present specification is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

Figure 2:
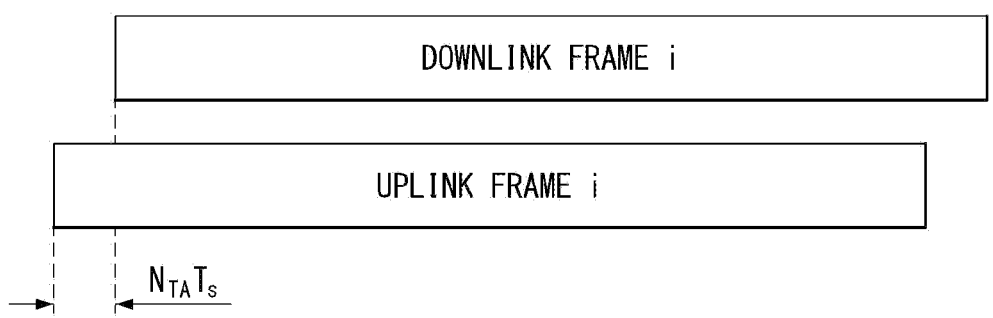
FIG. 2 illustrates a relationship between an uplink frame and a downlink frame in a wireless communication system to which a method proposed in the disclosure may be applied.

FIG. 2 illustrates a relation between a UL frame and a DL frame in a wireless communication system to which a method proposed by the present disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ slot of slots per subframe in a normal CP. Table 3 represents the number of OFDM symbols per slot, the number of slots per radio frame, and the number of slots per subframe in an extended CP.

TABLE 2

| $\mu$ | $N_{symb}^{slot}$ | $N_{slot}^{frame,\mu}$ | $N_{slot}^{subrame,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subrame,\mu}$ |
|---|---|---|---|
| 2 | 12 | 40 | 4 |

Figure 3:
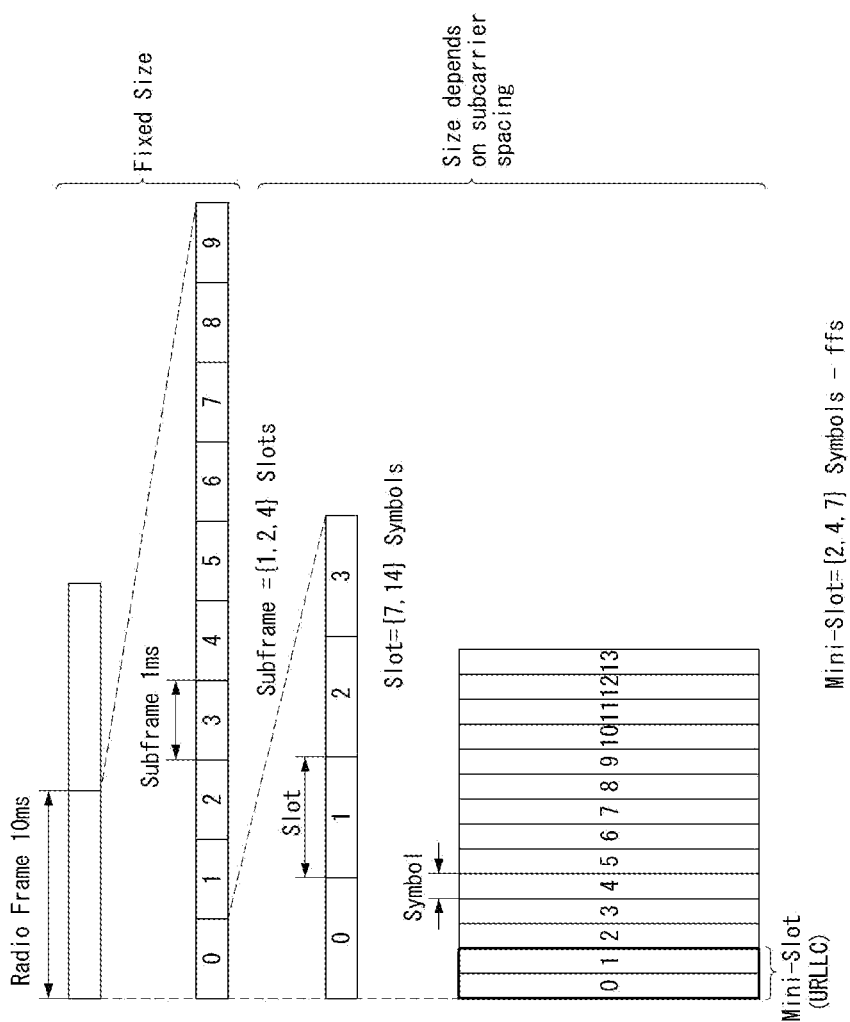
FIG. 3 illustrates an example of a frame structure in an NR system.

FIG. 3 illustrates an example of a frame structure in a NR system. FIG. 3 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, Average received power, and Received Timing.

Figure 4:
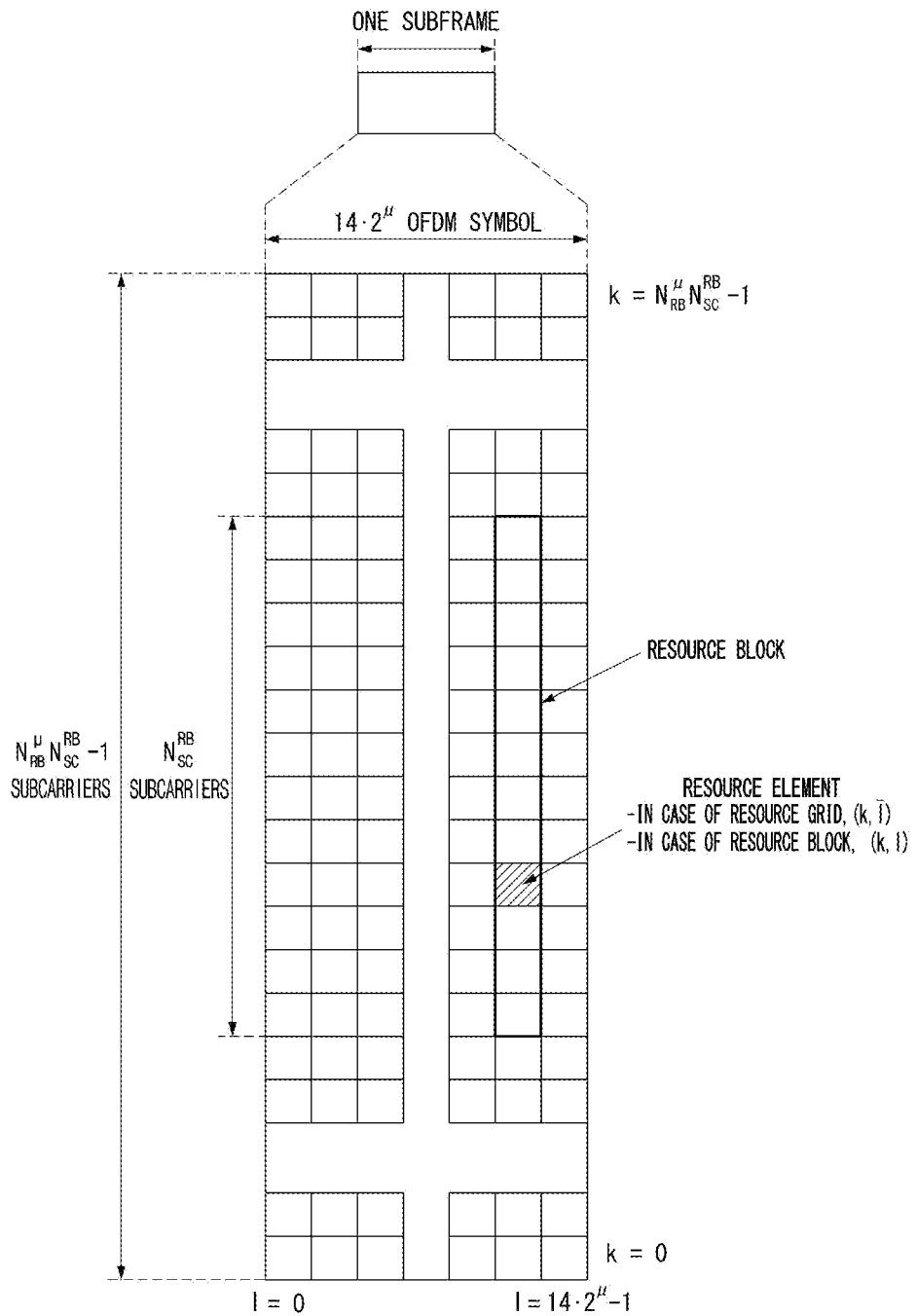
FIG. 4 illustrates an example of a resource grid supported by a wireless communication system to which a method proposed in the disclosure may be applied.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

Figure 5:
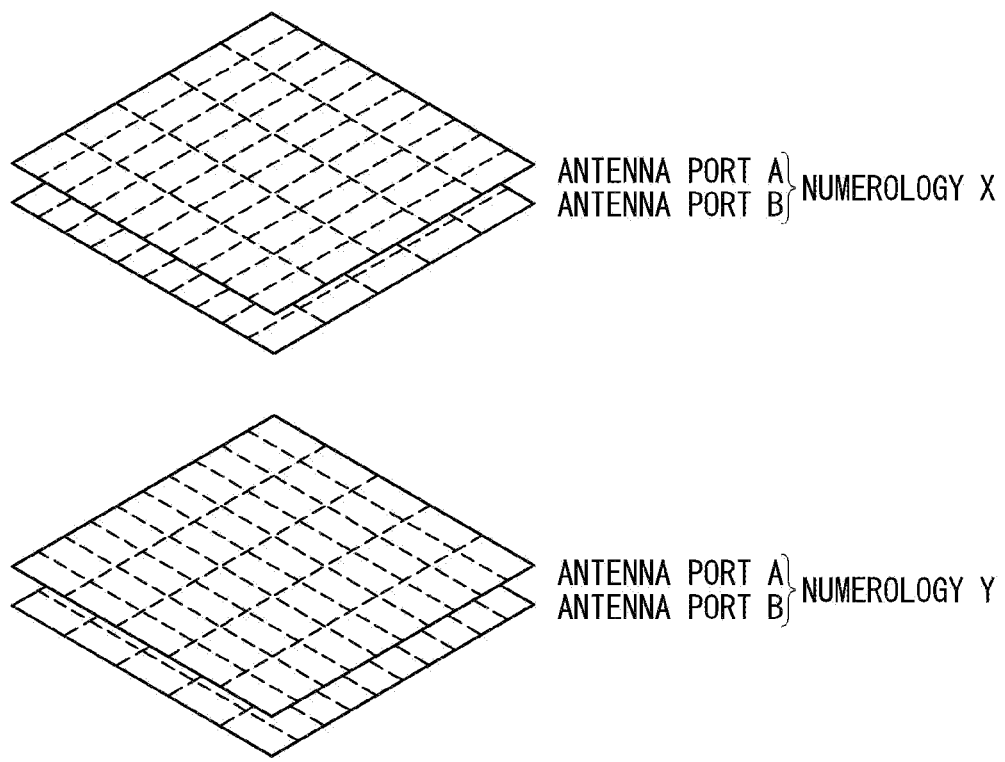
FIG. 5 illustrates examples of a resource grid for each antenna port and numerology to which a method proposed in the disclosure may be applied.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄), where k=0, . . . , $N_{RB}^\mu N_{sc}^{RB}-1$ is an index on a frequency domain, and refers to a location of a symbol in a subframe. The index pair (k,l) is used to refer to a resource element in a slot, where l=0, . . . , $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
  absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor$$

Here, k may be defined relative to the point A so that k=0 corresponds to a subcarrier centered around the point A. Physical resource blocks are defined within size a bandwidth part (BWP) and are numbered from 0 to $N_{BWP,w}^{size}-1$, where i is No. Of the BWP. A relation between the physical resource block $n_{PRB}$ in BWP and the common resource block $n_{CRB}$ may be given by the following. Equation 2.

$$n_{CRB}=n_{PRB}+N_{BWP,i}^{start} \qquad \text{[Equation 2]}$$

Here, $N_{BWP,i}^{start}$ may be the common resource block where the BWP starts relative to the common resource block 0.

Meanwhile, a PRB grid of each numerology supported by the carrier, BWP setting (up to 4 BWP supported) in each DL/UL carrier, code block group (CBG) setting, a transmission power control (TPC) per cell group, a HARQ process, a scrambling/sequencing related parameter, or the like may be set at a carrier level. A control resource set (set per cell, but associated per BWP), resource allocation related parameters and DM-RS configuration, CSI-RS related parameters, SRS resource set, HARQ-ACK and schedule request (SR) resource, set UL grant, or the like may be set at a BWP step.

Enhanced Mobile Broadband Communication (eMBB)

In the case of the NR system, a massive MIMO environment in which transmission and reception antennas are greatly increased may be considered. That is, as the massive MIMO environment is considered, the number of transmit/receive antennas may increase to tens or hundreds or more. In the massive MIMO environment, in order to reduce hardware implementation complexity, increase performance using multiple antennas, facilitate flexibility in resource allocation, and facilitate beam control for each frequency, a hybrid type beamforming in which an analog beamforming technique and a digital beamforming technique are combined according to a position where a beamforming weight vector/precoding vector is applied technique is required.

Figure 6:
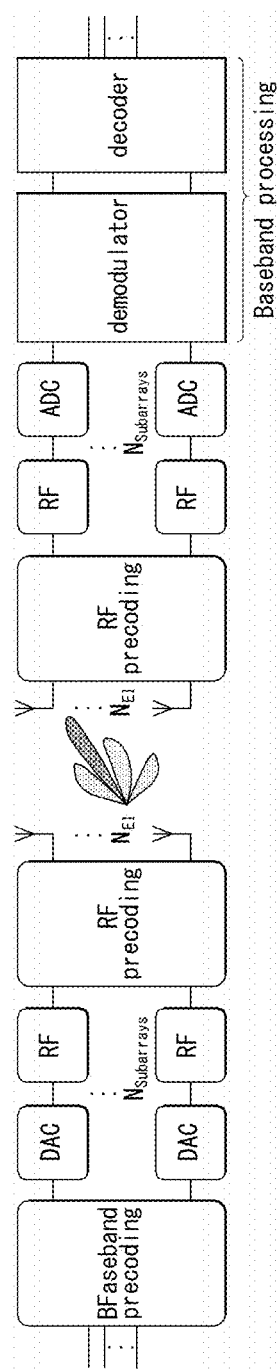
FIG. 6 is a diagram illustrating an example of a block diagram of a transmitting end and a receiving end.

FIG. 6 is a diagram illustrating an example of a block diagram of a transmitting end and a receiving end.

As illustrated in FIG. 6, when a transmission path is used, each element of a sub-array may have a phase shift applied directly to an RF domain, but a digital beamforming technique based on a complex weight vector may be applied to a signal that supplies each sub-array. The receiving end may receive a signal through a plurality of antennas and output a final signal through an analog to digital converter (ADC), a demodulator, a decoder, and the like. The final signal may be output as a differential signal in consideration of noise and signal amplification.

Figure 7:
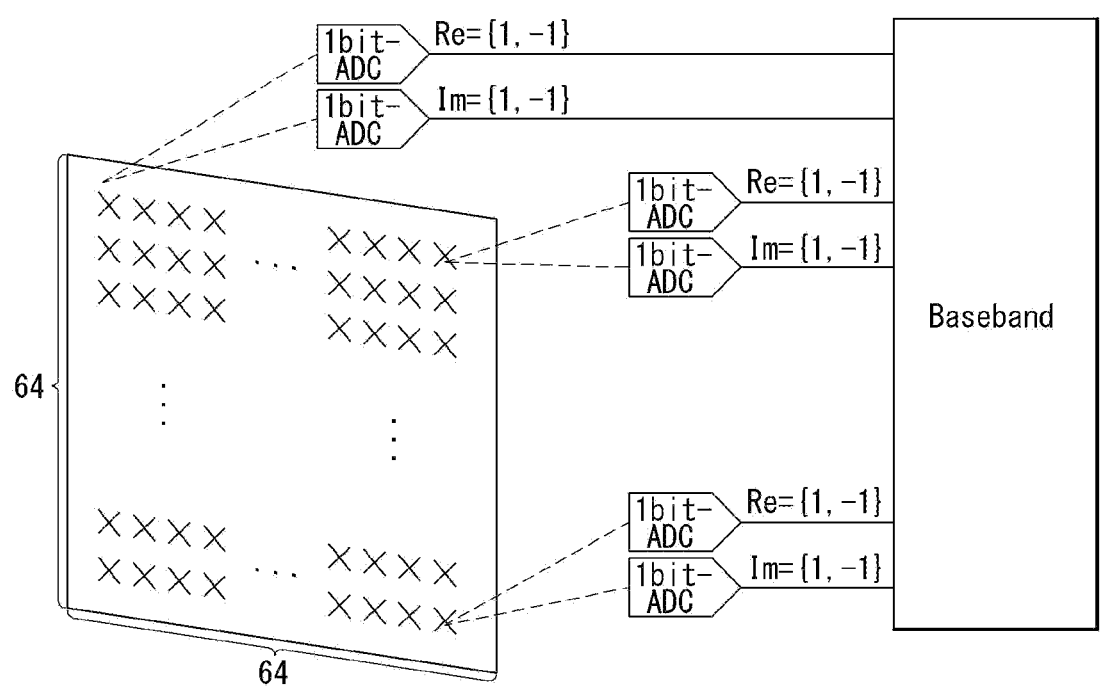
FIG. 7 illustrates an example of a receiving apparatus including a 64×64 two-dimensional antenna and a 1-bit analog to digital converter (ADC) connected to each antenna.

FIG. 7 illustrates an example of a receiving apparatus including a 64×64 two-dimensional antenna and a 1-bit analog to digital converter (ADC) connected to each antenna. Here, a radio frequency (RF) front-end in the front stage of the ADC is omitted. FIG. 7 is only for convenience of description, and does not limit the scope of the present disclosure.

Referring to FIG. 7, for example, the receiving apparatus includes 4096 (for example, 64×64) antennas, and may include each 1-bit ADC for an I (in-phase) signal (real signal) of a reception path (RX path) connected to each antenna and a Q (quadrature) signal (for example, an imaginary signal).

In the receiving apparatus including the existing high-performance ADC, a received signal in the form of a+bj (for example, a and b is a number expressed by 8 bits to 10 bits, respectively) was transmitted to the baseband as the output of the high-performance ADC. Hereinafter, the output signal of the existing high-performance ADC will be referred to as an unquantized version. The high-performance ADC is excellent in terms of resolution of an output signal, but may be disadvantageous in terms of system power consumption.

Meanwhile, referring to FIG. 7, the types of signals transmitted to the baseband through the 1-bit ADC may be limited to four types per reception path. That is, one signal among 1+j, 1−j, −1+j, and −1+j may be received for each reception path. Although it may be difficult for the receiving apparatus including the 1-bit ADC to obtain information such as signal to noise ratio (SNR) due to information loss such as the size of the received signal, information transmission through phase information may be easy and the power consumption of the system is much lower than that of high-performance ADC.

In the present disclosure, based on a modulation technique of a differential phase shift modulation method (for example, Differential Binary Phase Shift Keying (DBPSK), Differential Quadrature Phase Shift Keying (DQPSK), or the like), and a demodulation technique of non-coherent detection method, a transmitting and receiving method in a 1-bit quantization system is proposed. The 1-bit quantization system may use the 1-bit ADC, and thus, may be replaced with the term such as 1-bit ADC system. Hereinafter, for convenience of explanation, a Differential BPSK (DBPSK) method will be used as the basis. However, this is only for convenience of description, and does not limit a technical idea of present disclosure. Therefore, it is obvious that the DQPSK method may be equally applied.

The differential phase shift modulation (Differential Phase Shift Keying, DPSK) is a modulation method for transferring data based on the phase difference of carriers between consecutive symbols. For example, in the differential BPSK (DBPSK), it is possible to transmit "1" by adding 180° to a current phase and transmit "0" by adding 0° to the current phase. In the differential QPSK (DQPSK), a phase shift may correspond to 0°, 90°, 180°, and −90° corresponding to data "00", "01", "11", and "10". In the receiving apparatus, demodulation is possible when only the phase difference between adjacent symbols is known.

Figure 8:
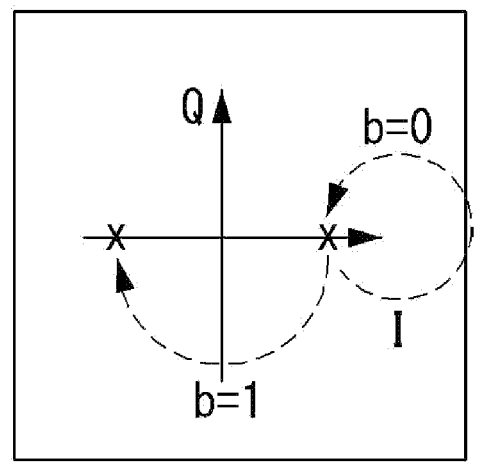
FIG. 8 illustrates an example in which DBPSK modulation is performed.

FIG. 8 illustrates an example in which the DBPSK modulation is performed. In order to transmit 0 in the DBPSK modulation, the same symbol as the symbol modulated in the previous symbol is transmitted. To transmit 1, a symbol is transmitted by applying a phase difference of $\pi$ from the previous symbol. Referring to FIG. 8, the transmitting apparatus may continuously transmit 1,1 to transmit 0, and may continuously transmit 1,0 to transmit 1. While the transmitting apparatus transmits a signal, it may be assumed that a coherence time is the same, that is, the channel does not change and is the same. Hereinafter, for convenience of description, it is assumed that when b=0, that is, 1 and 1 are continuously transmitted. However, this is only for convenience of description, and does not limit the technical idea of present disclosure.

Figure 9:
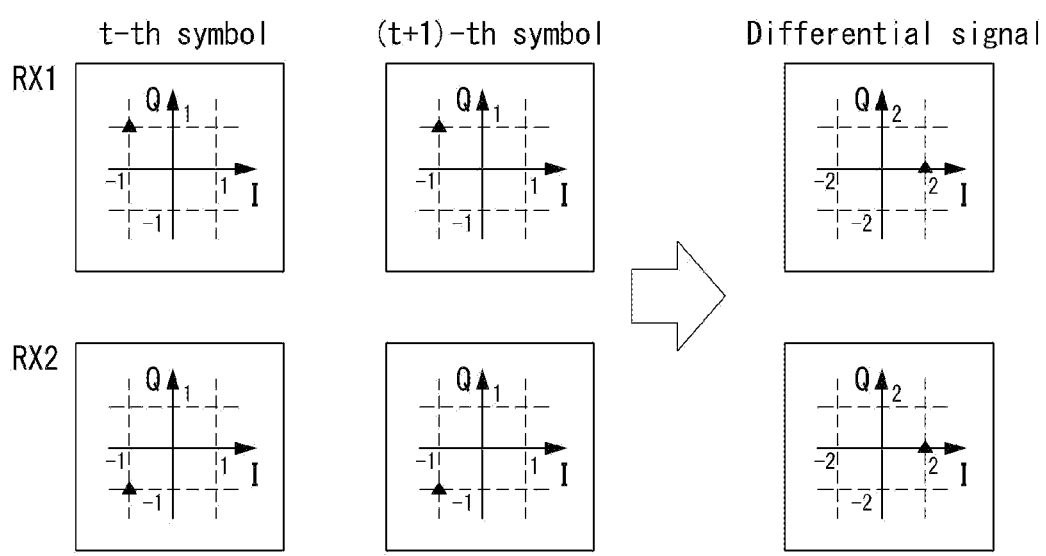
FIG. 9 illustrates an example of a result of passing a coded signal received by the receiving apparatus through the 1-bit ADC.

FIG. 9 illustrates an example of a result of passing a coded signal received by the receiving apparatus through the 1-bit ADC. It may be assumed that the coded signal is a signal modulated by the DBPSK method.

Referring to FIG. 9, in the case of a reception path 1 (RX1), −1+j is received in the t-th symbol, and −1+j is also received in the t+1-th symbol. Accordingly, on the assumption that the channels between the two are the same, the receiving apparatus may determine that 0 has been received through decoding, and a differential value at this time may be output as 2. That is, the differential value may be expressed as a product of a conjugate value of a value received in the t-th symbol and a value received in the t+1 symbol. In the case of a reception path 2 (RX2), after passing through the channel similarly, −1-j is received in both the t-th symbol and the t+1 symbol, and a differential value of 2 may be output. Therefore, the receiving apparatus may assume that the transmitting apparatus has transmitted b=0.

<Method 1>

As described above, the transmitting and receiving method in the 1-bit ADC system may transmit one of four values to the baseband, unlike the existing non-quantization version. As the signal passes through 1-bit ADC, all signal magnitude information is lost, and while phase information is quantized into four types, the information loss may occur. Nevertheless, under the assumption that the channels are the same from the viewpoint of non-coherent detection, data detection is possible using only the phase change of two consecutive symbols. Therefore, the receiving apparatus in the 1-bit ADC system needs to consider a new receiving technique.

In general, the receiving apparatus performs decoding on coded bits that have undergone channel coding. Therefore, it is necessary to calculate a log-likelihood ratio (LLR) value indicating reliability of the received coded bits.

Equation 3 represents an LLR when a bit x encoded at a time index k is received as y through the decoder.

$$L(x_k/y_k) = \ln \frac{P(x_k = 1/y_k)}{P(x_k = -1/y_k)}$$ [Equation 3]

$$L(x_k|y_k) = \ln \frac{P(y_k/x_k = +1)}{P(y_k/x_k = -1)} = \ln \frac{e - \frac{Eb}{N_0}(y_k - a)^3}{e - \frac{Eb}{N_0}(y_k + a)^3} = 4\frac{Eb}{N_0} a y_k$$

As illustrated in Equation 3, a signal to noise ratio (SNR) information is essential for the LLR calculation, but since it is difficult to obtain the SNR in a 1-bitADC system, it may also be difficult to obtain an accurate LLR value.

Therefore, it is necessary to consider a method for calculating the reliability (for example, LLR) in the 1-bit ADC system.

In the 1-bit ADC system, the reliability of the received coded bit may be calculated using a signal received through each of a plurality of reception paths (for example, all reception paths). For example, as in the example of the receiving apparatus of FIG. 7 described above, it may be assumed that there are 4096 reception paths. A differential value of two consecutive symbols modulated with DBPSK received in each reception path may be one of {2, 2j, −2, −2j} as described above. It may be assumed that the differential values for the 4096 reception paths are as illustrated in Table 4 (it may be expressed by normalizing each differential value to ½ value).

The receiving apparatus may determine that the same signal has been received as the number of differential values of the signals output from each reception path is greater than 1, and as the number of −1 is greater, the receiving apparatus may determine that the inverted signal has been received. When the LLR is 0, it may be determined that the reliability of the received signal is low because the case where 1 is received and the case where −1 is received are half and half. Accordingly, from the data detection point of view, it may be said that the received bit has the highest reliability when the Zk values are all 1 or all −1. Through the above-described LLR calculation method, the receiving apparatus may perform data decoding.

In addition, since the LLR value is proportional to the sum of the real values of the differential values of each signal output from each reception path of the plurality of reception paths (for example, all reception paths) of the receiving apparatus, the reliability of the received signal may be proportional to the number (for example, the number of antennas) of the plurality of reception paths (for example all reception paths) of the receiving apparatus. For the same signal, it may be determined that the reliability of the received signal is high as the result of receiving the same signal from each antenna is the same. In addition, the weight of the LLR may be adjusted according to the number of reception paths (for example, the number of antennas) of the receiving apparatus. For example, the greater the number of antennas of the receiving apparatus, the greater the weight for the calculated LLR value may be applied.

<Method 2>

As described above, it may be confirmed that the reliability of data transmitted through the DBPSK is proportional to the LLR value of the reception path, that is, the correlation between the values of Zk. Therefore, by identifying a degree of this correlation through a consecutive reference signal (RS) and reporting the degree to the trans-

TABLE 4

| RX | RX 1 | RX 2 | RX 3 | . | . | . | . | RX4093 | RX4094 | RX4095 | RX4096 |
|---|---|---|---|---|---|---|---|---|---|---|---|
| Differential signal value | 1 | 1 | −1 | −1 | j | | −j | 1 | 1 | 1 |

Referring to Table 4, in a reception path having a differential value of 1, it may be determined that the coded bit is 0, and when the differential value is −1, it may be determined that the coded bit is 1. Moreover, in the case of a reception path having a differential value of j or −j, it may be seen that the received bit has no reliability because the probability that the coded bit is 0 or 1 is half and half.

Therefore, in the 1-bit ADC system environment, the LLR value may be expressed by Equation (4). Here, Zk denotes a differential value of a signal output from a k-th reception path.

$$LLR \propto \Sigma_{k=1}^{4096} Re\{Zk\}$$ [Equation 4]

Referring to Equation 4, the LLR value of the coded bit may be proportional to the sum of real values of the differential values of signal output from each reception path of a plurality of reception paths (for example, all reception paths) of the receiving apparatus. That is, the LLR value of the coded bit may be proportional to the real value of the sum of signals outputs from each reception path of the plurality of reception paths (for example, all reception paths) of the receiving apparatus.

mitting apparatus, the transmitting apparatus and the receiving apparatus may adjust the data transfer adaptively to the channel quality.

Hereinafter, a method for measuring and reporting channel quality for an adaptive link technique in the 1-bit ADC system based on differential modulation and demodulation will be described.

Figure 10:
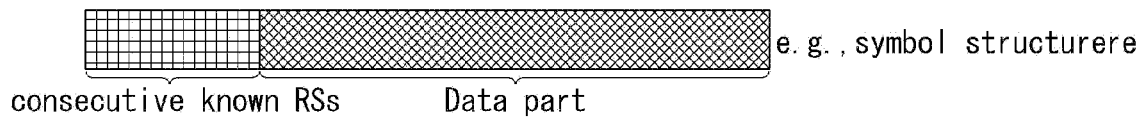
FIG. 10 illustrates an example of a symbol structure.

FIG. 10 illustrates an example of a symbol structure. Referring to FIG. 10, a known reference signal may be transmitted continuously. A method of calculating channel quality based on a continuously transmitted reference signal may be considered.

In the present disclosure, channel quality in a 1-bit ADC system will be referred to as spatially aggregated channel quality (SACQ) (hereinafter, SACQ).

Equation 5 illustrates an equation for calculating the SACQ. The SACQ may be defined as a real value of the sum of differential signal values of all reception paths that receive reference signals of two consecutive identical symbols and have received them.

$$SACQ = \text{Real}(\Sigma_{k=1}^{N} Q_k) \qquad \text{[Equation 5]}$$

Here, $Q_k$ denotes a differential value of an output signal based on a consecutive reference signal received in each reception path.

For example, when two consecutive modulated symbols are transmitted with 1,1, the differential value of each reception path of the receiving apparatus may be one of {1, −1, j, −j} (normalized). In addition, when two consecutive modulated symbols are transmitted with 1 and −1, the same difference values may be obtained by multiplying the final value by −1. In addition, multiples of the total value are also possible.

As a specific example, when two consecutive modulated reference signal symbols are transmitted as 1 and 1, the receiving apparatus may determine that the channel state is good when the differential value is 1 (normalized). Meanwhile, when the differential value is −1 (normalized), since the transmitted signal is inverted and received, it may be determined that the channel state is bad or the SNR is bad.

When the number of reception paths connected to 1-bit ADC is N (for example, N is a natural number) in the receiving apparatus, the maximum value of SACQ is N, and the minimum value may correspond to −N. The SACQ value may depend on the number N of reception paths. That is, the maximum value, minimum value, and range of channel quality (for example, SACQ) may vary depending on the number of reception paths connected to the 1-bit ADC. For example, a receiving apparatus having 4096 (N=4096) reception paths may have the maximum value of 4096, the minimum value of −4096, and the range of −4096 to 4096 in the SACQ value. The receiving apparatus having 256 (N=256) reception paths may have the maximum value of 256, the minimum value of −256, and the range of −256 to 256 in the SACQ value. Accordingly, from the viewpoint of reliability of the received coded bits, it may be said that the case in which the SACQ has a value of 4096 is higher than the case where the SACQ has a value of 256.

In order to support the SACQ values of receiving apparatus having different number of reception paths (for example, N) in the system in performing channel quality measurement and reporting for the adaptive link technique in the 1-bit ADC system, the transmitting apparatus and the receiving apparatus may transmit/receive information related to the SACQ.

For example, the receiving apparatus may receive the SACQ range set from the transmitting apparatus. The transmitting apparatus may inform the receiving apparatus of the maximum value (for example SACQ_max or N_req, or the like) of SACQ as system information through a broadcast method. Here, the maximum value (for example SACQ_max or N_req, or the like) of SACQ indicates the number of reception paths including the 1-bit ADC determined to have the highest spectral efficiency.

Alternatively, the receiving apparatus may transmit the number of their reception paths to the transmitting apparatus upon initial connection.

Alternatively, by combining the above cases, the receiving apparatus may receive the maximum value (for example SACQ_max or N_req, or the like) of SACQ from the transmitting apparatus, and transmit the number of the own reception path to the transmitting apparatus.

Alternatively, the receiving apparatus transmits the number of its reception paths to the transmitting apparatus, and the transmitting apparatus may send the maximum value of SACQ and/or the range of SACQ to the receiving apparatus based on the number of reception paths of the received receiving apparatus.

The transmitting apparatus transmits a known consecutive reference signal of two symbols for measuring the SACQ to the receiving apparatus, and the receiving apparatus receiving the reference signal may report each SACQ value. When the SACQ value to be reported is larger than the maximum value (for example SACQ_max or N_req, or the like) of SACQ set by the transmitting apparatus, it may be reported as SACQ_max. When the SACQ value to be reported is smaller than the −SACQ_max value, it may be reported as −SACQ_max.

As a specific example, it may be assumed that the SACQ_max value set by the transmitting apparatus is 64, one receiver has 16 reception paths, and another receiver has 128 reception paths. In this case, the range of the SACQ value of the receiver having the 16 reception paths may correspond to −16 to 16. Meanwhile, in the case of the receiver with 128 reception paths, the receiver may have the SACQ value in the range of −128 to 128, and when the actual measured value is less than −64, it may be reported as −64, and when the actual measured value is larger than 64, it may be reported as 64.

As described above, the calculated SACQ value itself may be transmitted to the transmitting apparatus. Alternatively, the SACQ value may be mapped to a specific function and transmitted to the transmitting apparatus as feedback information. For example, it may be mapped and transmitted in the form of f(SACQ, others) (here, f represents a function).

The range of the SACQ value may depend on the number of reception paths of the receiving apparatus. When the number of the reception paths of the receiving apparatus is small, it may occur that the range of the SACQ value set by the system cannot be reached. For example, when the maximum and minimum values of the SACQ values set by the system are 64 and −64, respectively, the receiving apparatus having 16 reception paths may not satisfy the maximum spectral efficiency set by the system. Therefore, it is necessary to consider a method for extending the range of the SACQ value.

In one example, the transmitting apparatus may continuously transmit a reference signal for SACQ measurement M+1 times (M is a natural number), and the receiving apparatus may receive the reference signals transmitted M+1 times and the SACQ value as much as M times (M× the number of reception paths) the number of reception paths. A final SACQ value may be calculated by adding the measured SACQ values. In this case, the M value may be signaled between the transmitting apparatus and the receiving apparatus, and may be set through a specific physical layer signal or higher layer signaling of the receiving apparatus. Signaling for SACQ accumulation may be triggered by the transmitting apparatus or by the receiving apparatus.

As a specific example, it may be assumed that the receiving apparatus has 16 reception paths, and the maximum value of the set SACQ value is 64. In this case, since the receiving apparatus cannot satisfy the range of the SACQ value set by the system, it is possible to expand the SACQ value according to the above-described method. When M=4, the transmitting apparatus may transmit a known reference signal a total of 5 times, and the receiving apparatus may calculate the SACQ value of 4 times in the time domain from the differential signal. The SACQ value in the range of −64 to 64 may be obtained by adding total of four SACQs.

Alternatively, a length of the reference signal for SACQ measurement may be linked to the number of reception paths of the receiving apparatus. For example, when the number of reception paths of the receiving apparatus is N, and the SACQ_max set by the transmitting apparatus corresponds to M times (N×M) of the number of the reception paths, the transmitting apparatus may transmit by adjusting the length of the reference signal for SACQ measurement in consideration of the M value. The transmitting apparatus may transmit a reference signal corresponding to (M+1) times the length of the reference signal when SACQ_max is N. As a specific example, when the SACQ_max value is 128 and there are 16 reception paths, M=8 may be set, the transmitting apparatus may transmit a reference signal of a length corresponding to 9 times the reference signal when the SACQ_max value is 16, and the receiving apparatus may receive a total of 9 known reference signals, and measure and report the reference signals.

The reliability of the SACQ value may be determined by the number of repetitions of a known reference signal. However, in a case where two known reference signals are adjacent symbols, even when the SACQ measurement is repeated several times, it may be considered that the reliability of the SACQ value itself is not great. Therefore, there is a need for a method to increase the reliability of the SACQ value itself.

As an example, the transmitting apparatus may continuously transmit the reference signal for SACQ measurement M+1 times, and the receiving apparatus may measure the SACQ value M times and obtains an average of the measured SACQ values, thereby increasing the reliability of the SACQ value itself. In this case, M may be set through a specific physical layer signal or higher layer signaling of the receiving apparatus between the transmitting apparatus and the receiving apparatus. Signaling for the SACQ accumulation may be triggered by the transmitting apparatus or by the receiving apparatus.

As a specific example, it may be assumed that the receiving apparatus has 64 reception paths and the SACQ_max value is 64. Since the number of reception paths of the receiving apparatus satisfies the SACQ_max range, it is possible to calculate the SACQ value by performing the SACQ measurement once. However, in order to increase the reliability of the SACQ value itself, the SACQ measurement may be repeated. For example, when M=3, the transmitting apparatus may transmit a known reference signal a total of 4 times, and the receiving apparatus may measure the SACQ 3 times in the time domain from the differential value of the output signal. By calculating the average value of the SACQs measured three times, a more reliable SACQ value in the range of −64 to 64 may be obtained compared to the existing SACQ value.

Signal transmission and reception in the 1-bit ADC system is possible through the above-described methods and embodiments, and the data transfer rate may be adaptively adjusted in the 1-bit ADC system based on differential modulation and demodulation by measuring and reporting channel quality (for example, SACQ) using a known consecutive reference signal.

<Method 3>

As described above, the maximum amount of information in the receiving apparatus using the 1-bit ADC may be 2 bps/Hz, which is equal to the differential QPSK (DQPSK) for each reception path, as the maximum spectral efficiency. In terms of the system operation, only energy suitable for the corresponding spectral efficiency may be appropriately used through transmission (TX) power control. However, a method for improving the maximum spectral efficiency by using many antennas in the massive MIMO environment may be considered. Therefore, the present disclosure proposes a spatially aggregated phase modulation (SAPM) (hereinafter referred to as SAPM) technique to improve spectral efficiency.

Output signals through 1-bit ADC may be sorted into up to 4 signals based on 2 bits. Therefore, in order to transmit a signal of more bits, it is necessary to add a basis for the receiving apparatus to sort in one symbol. For this, a method of using a phase of a channel and a receiving antenna may be considered.

First, a basis of spatially aggregated phase modulation (SAPM) may be generated through a rotated reference signal.

Hereinafter, a method for transmitting and receiving 3 bits will be described as a reference. However, this is only for convenience of explanation, and does not limit the technical idea of present disclosure. Accordingly, it is of course applicable even when transmitting and receiving a number of bits greater than 3 bits.

Referring to FIG. 10, the transmitting apparatus may continuously transmit a known reference signal (RS). In this case, the rotation may be sequentially applied to the reference signal and transmitted. For example, a reference signal 1 (RS1) may be transmitted as 1, and a reference signal 2 (RS2) may be transmitted by rotating the reference signal 1 by π/4. Transmitting $$e^{j\frac{\pi}{4}}$$

rotated by 1 and π/4 is only for convenience of explanation, and does not limit the technical idea of the present disclosure. Accordingly, it may include rotating the two reference signals identically by an arbitrary phase.

Figure 11:
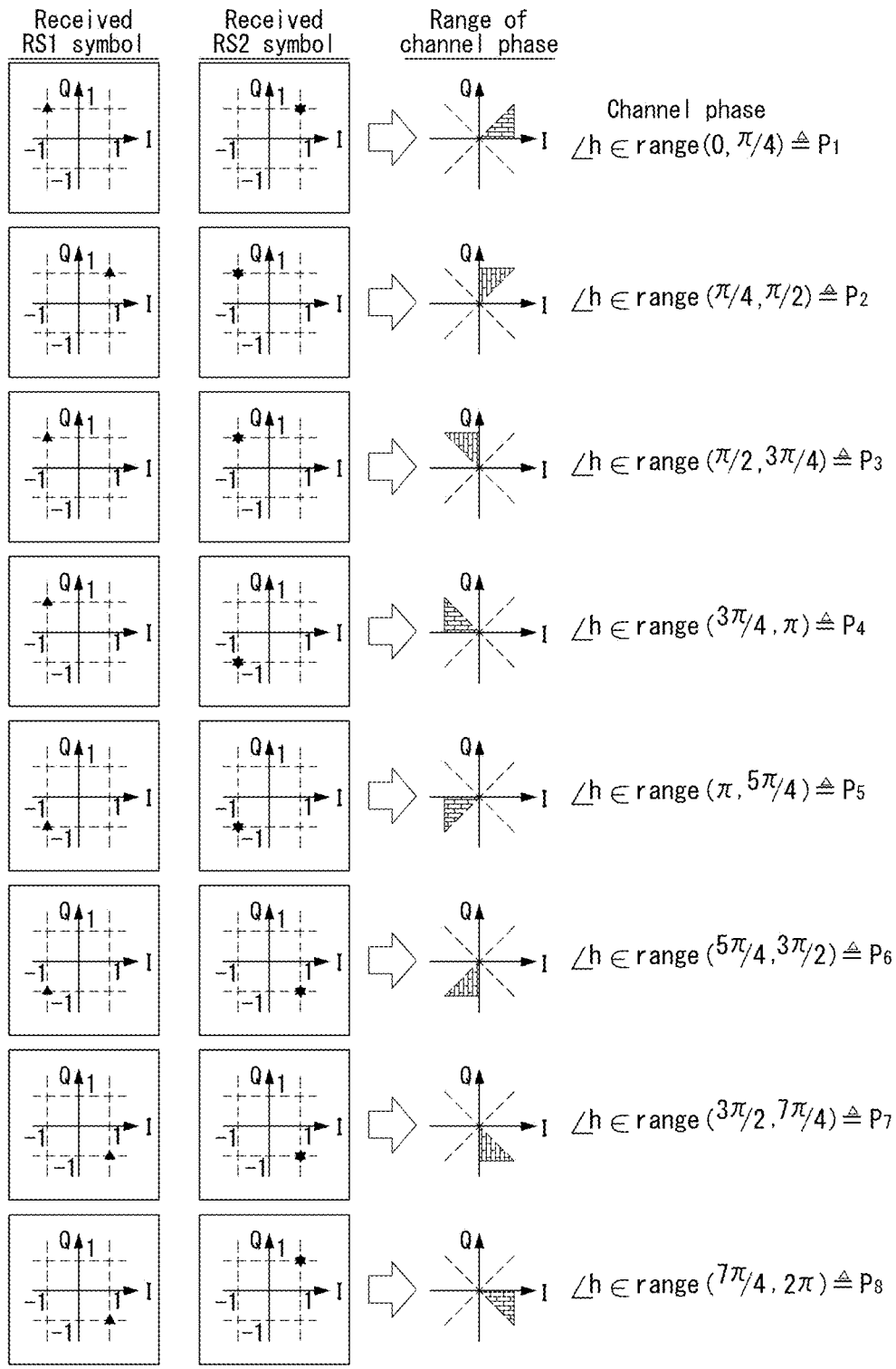
FIG. 11 illustrates an example of an output signal after passing through the 1-bit ADC through channel demodulation in the receiving apparatus.

FIG. 11 illustrates an example of the output signal after passing through the 1-bit ADC through the channel demodulation in the receiving apparatus. Referring to FIG. 11, the received signal from the receiving apparatus with respect to the reference signal transmitted from the transmitting apparatus may be largely expressed as one of the ranges of eight channel phases. The ranges of the channel phases may be sorted based on the degree of the phase rotation in the signal received from the receiving apparatus, compared to the original signal transmitted from the transmitting apparatus. The range of each channel phase may be represented by P1 to P8, and here, the ranges of the channel phases may be grouped into two groups. It may be grouped into the first group G1={P1, P3, P5, P7} and the second group G2={P2, P4, P6, P8}. Through this, it is possible to create the basis of the SAPM that may sort 3 bits. The receiving apparatus may receive the data signal and sort the 3-bit signal by selecting the range of one channel phase from each group to form a pair based on the basis of the generated SAPM.

Figure 12:
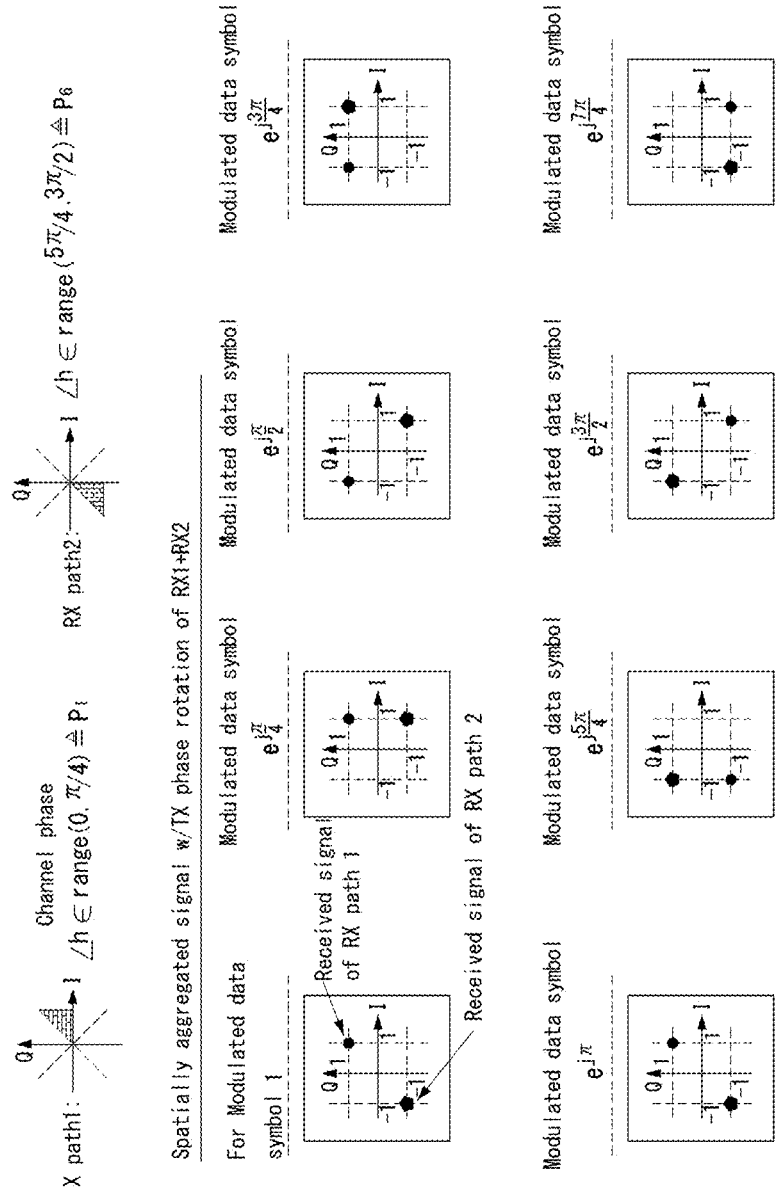
FIG. 12 illustrates an example of a method of sorting a 3-bit signal based on a SAPM basis.
Figure 13A:
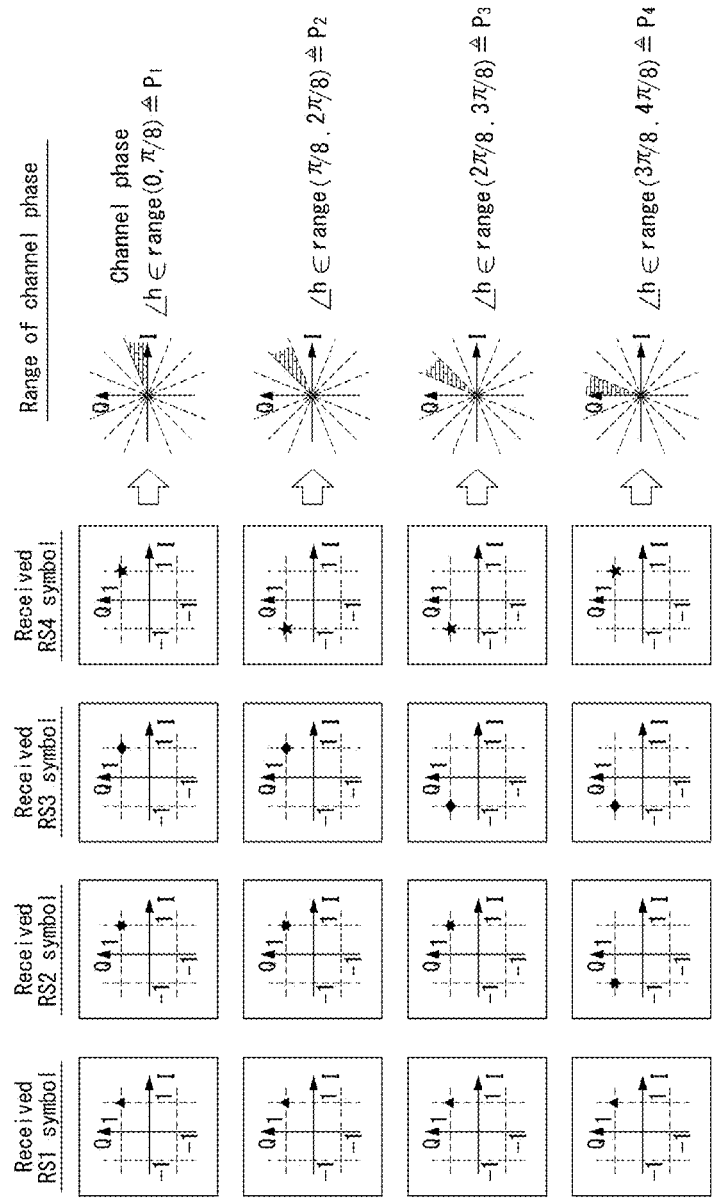
FIGS. 13A to 13D illustrate an example of a method for generating the basis of the SAPM capable of sorting 4 bits.
Figure 13B:
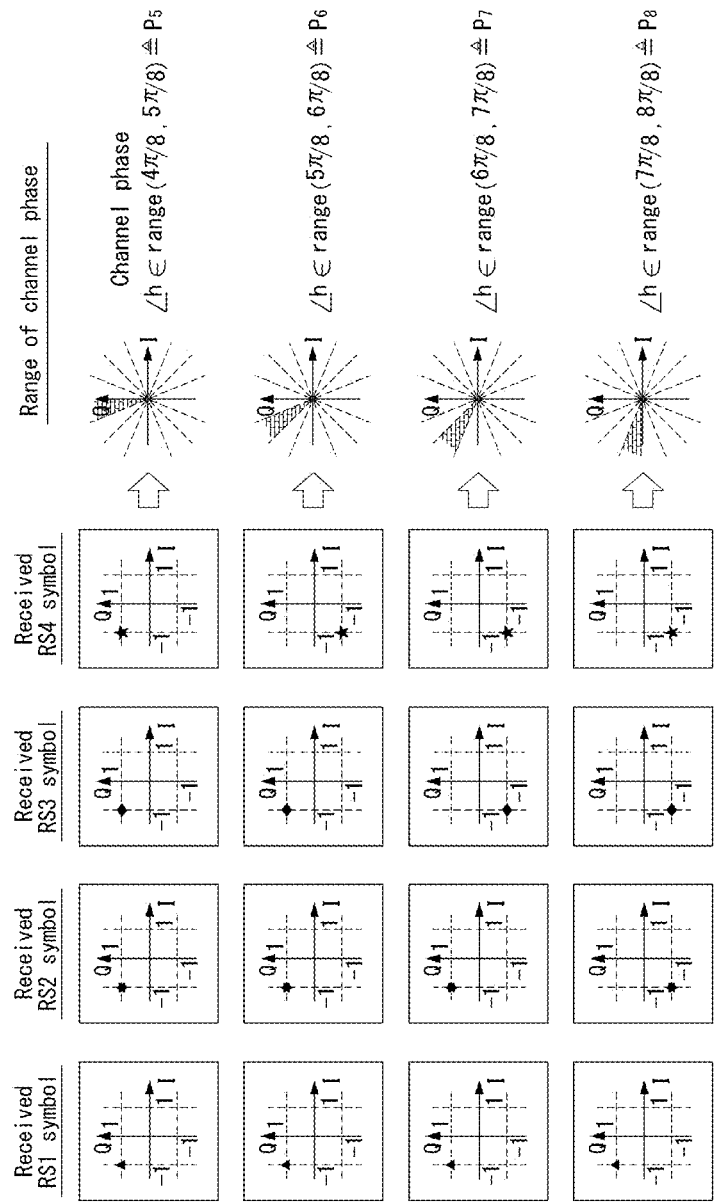
Figure 13C:
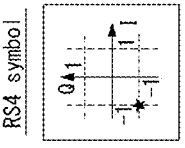
Figure 13D:
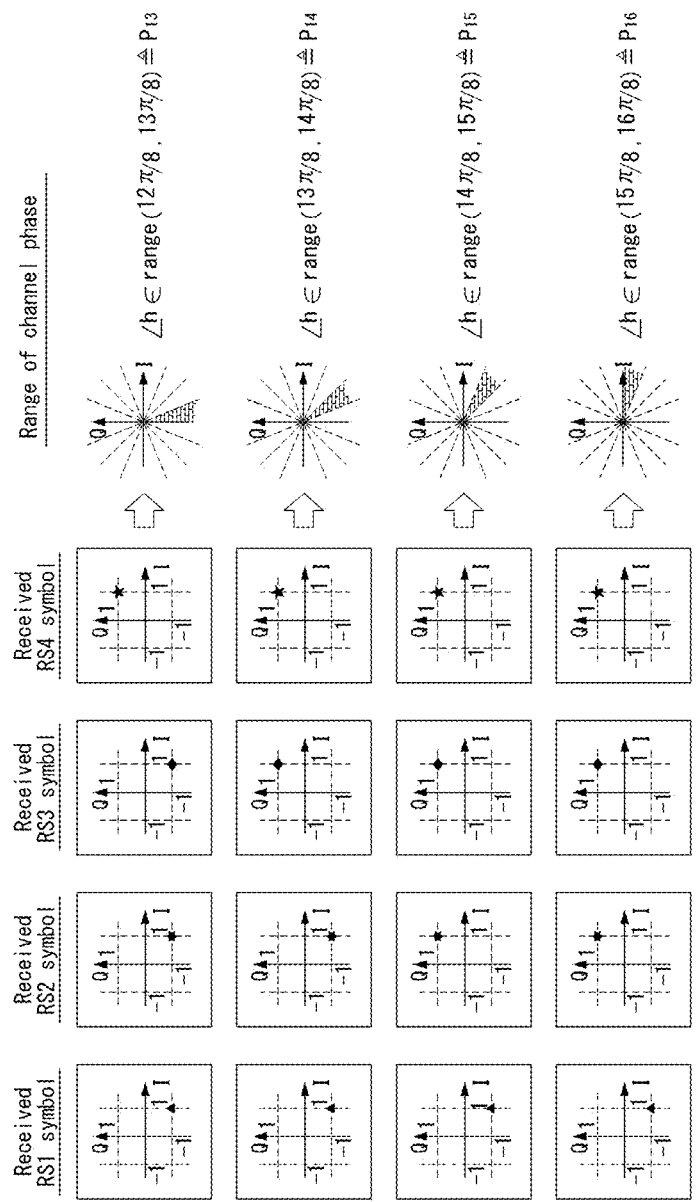

FIG. 12 illustrates an example of a method of sorting a 3-bit signal based on the SAPM basis. FIG. 12 is only for convenience of explanation, and does not limit the technical idea of the present disclosure. Referring to FIG. 12, it may be assumed that one of the ranges of the channel phase of the signal received in different reception paths of the receiving apparatus belongs to P1 and the other belongs to P6. A total of eight signals may be sorted through an aggregation of the range of the channel phase of the different reception paths. Therefore, the transmitting apparatus may transmit 3 bits through the modulation. By rotating the phase of the symbol in a unit of π/4, signals modulated by a total of 8 SAPMs may be sorted.

FIGS. 13A to 13D illustrate an example of a method for generating a basis of the SAPM capable of sorting 4 bits. FIGS. 13A to 13D are only for convenience of description, and do not limit the technical idea of the present disclosure.

Referring to FIGS. 13A to 13D, the first reference signal may be rotated by 1 and thereafter, by π/8 for each reference signal to transmit four consecutive rotated reference signals. That is, $$1 e^{j\frac{\pi}{8}} e^{j\frac{2\pi}{8}} e^{j\frac{3\pi}{8}}$$

may be transmitted continuously. The received signal from the receiving apparatus for the consecutive four rotated reference signals transmitted from the transmitting apparatus may be largely expressed as one of the 16 channel phase ranges. The range of the channel phase may be sorted according to how much the phase rotation of the received signal received from the receiving apparatus compared to the original signal transmitted from the transmitting apparatus is. The range of each channel phase may be represented by P1 to P16, and here, the range of the channel phase may be grouped into four groups. A first group G1={P1, P5, P9, P13}, a second group G2={P2, P6, P10, P14}, a third group G3={P3, P7, P11, P15}, and a fourth group G4={P4, P8, P12, P16} are realized. Through this, it is possible to create the basis of the SAPM capable of sorting 4 bits. The receiving apparatus may receive the data signal and sort the 4-bit signal by selecting a range of one channel phase from each group to form a pair based on the generated SAPM.

Figure 14A:
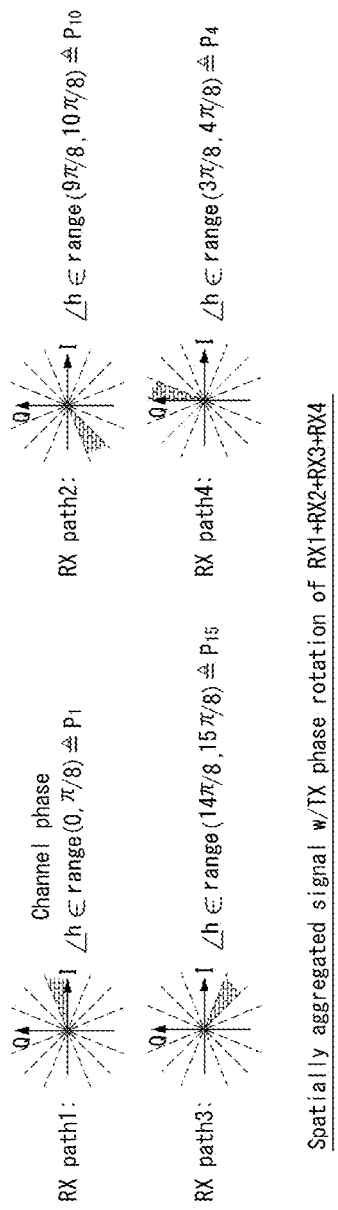
FIGS. 14A and 14B illustrate an example of a method of sorting a 4-bit signal based on the SAPM basis.
Figure 14B:
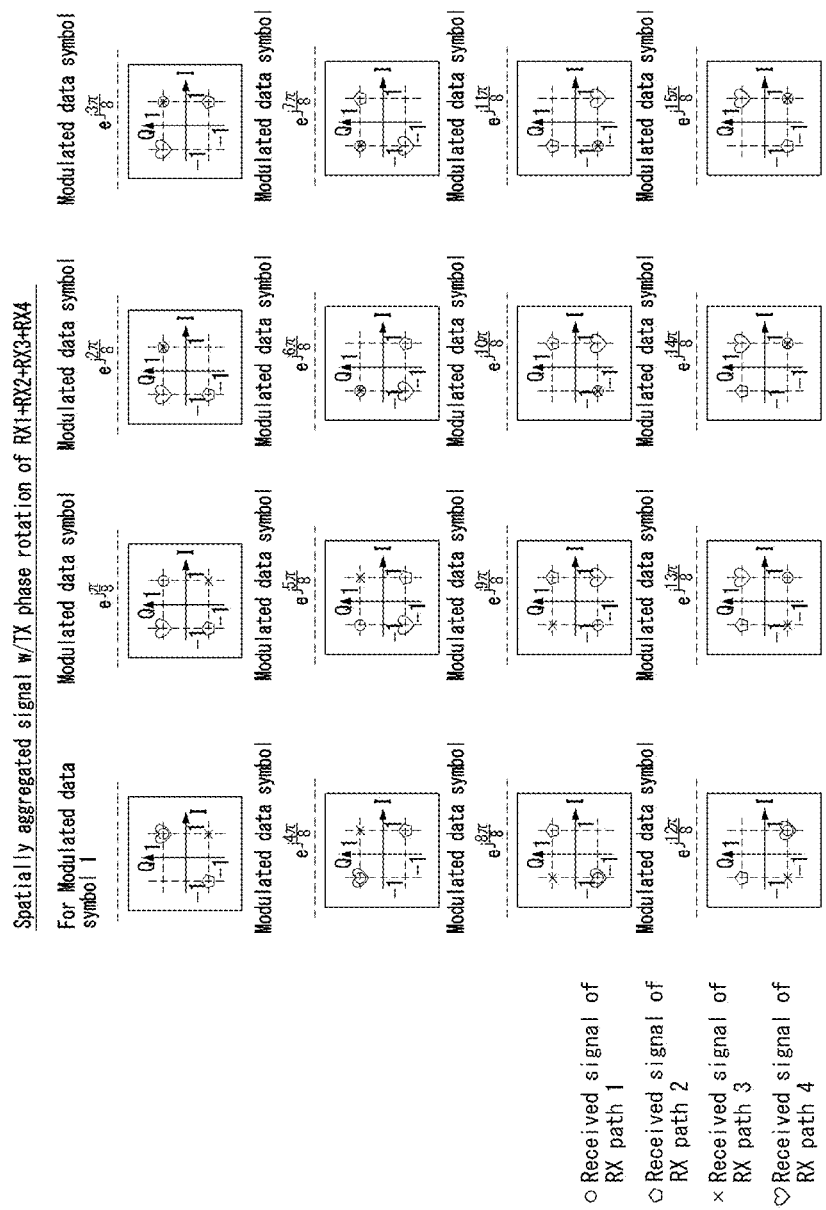

FIGS. 14A and 14B illustrate an example of a method of sorting a 4-bit signal based on the SAPM basis. FIGS. 14A and 14B are only for convenience of description, and do not limit the technical idea of the present disclosure. Referring to FIGS. 14A and 14B, it may be assumed that the channel phase ranges of signals received through different reception paths belong to P1, P10, P15, and P4. A total of 16 signals may be sorted through an aggregation of the ranges of the channel phases of the different reception paths. Accordingly, the transmitting apparatus may transmit 4 bits through modulation. By rotating the phase of the symbol by π/8, the signals modulated by a total of 16 SAPMs may be sorted.

By generalizing the above-described examples, for modulation of K (for example, K is a natural number greater than or equal to 3) bits, the transmitting apparatus may continuously and sequentially transmit the reference signal symbol having the length of $2^{K-2}$ while rotating the reference signal symbol by $\pi/2^{K-1}$. Moreover, the receiving apparatus may sort the ranges of the channel phases from $P_1$ to $P_2K$, that is, the ranges of the total $2^K$ channel phases. $2^{K-2}$ groups may be created by grouping the range of the channel phase. Each group may be expressed as in Equation 6, where M. $2^{K-2}$ denotes the number of groups.

$$G_n = \{P_n, P_{M+n}, P_{2M+n}, P_{3M+n}\}, \text{ for } n=1, \ldots, M \quad \text{[Equation 6]}$$

In this way, it is possible to create the basis of the SAPM.

Based on the basis of SAPM, K-bit transmission/reception may be possible by selecting the range of the channel phase one by one from each of the groups and forming a pair to configure a spatial set.

As described above, on the basis of the generated SAPM, the transmitting apparatus and the receiving apparatus may perform the K-bit modulation and demodulation. The transmitting apparatus may also modulate the data to be transmitted through the phase rotation. A basic symbol (for example, a reference signal) needs to create the basis of the SAPM. Although the above-described examples perform modulation by applying rotation based on the first reference signal, it is obvious that the above-described methods and embodiments may be equally applied even when the rotation is applied based on another reference signal. In addition, it may be applied even when an order of the rotated reference signals is changed. It may be preset between the transmitting apparatus and the receiving apparatus with respect to which reference signal the rotation is applied based on. All reference signals may be rotated by the same phase.

The mapping between how many bits the transmitting apparatus transmits and the rotational phase may be preset between the transmitting apparatus and the receiving apparatus. For example, considering a spatially aggregated modulation scheme, it may be set so that a change of one bit has a maximum distance. Here, the symbol modulated by the SAPM method may be viewed as vector modulation and may be mapped to have a maximum Euclidean distance in the vector region.

When the range of the channel phase is grouped, in a case where a reception path corresponding to a specific group does not exist, demodulation of a signal modulated by SAPM may be impossible. When this happens, the receiving apparatus may report it to the transmitting apparatus later.

Figure 15:
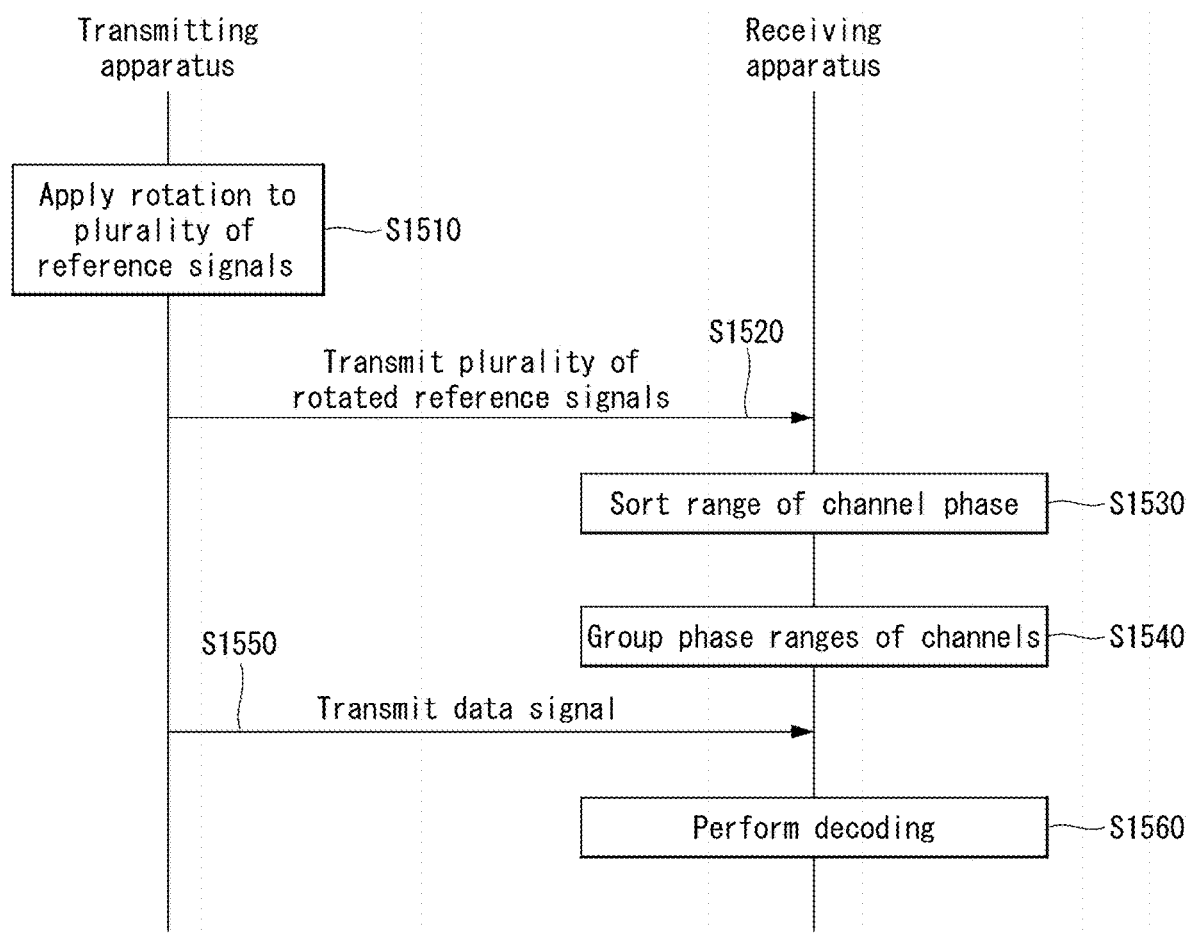
FIG. 15 illustrates an example of a signaling procedure of a device for transmitting and receiving a signal based on 1-bit quantization to which the method and embodiment proposed in the present disclosure may be applied.

FIG. 15 illustrates an example of a signaling procedure of an apparatus for transmitting and receiving a signal based on the 1-bit quantization to which the method and embodiment proposed in the present disclosure may be applied. FIG. 15 is only for convenience of description, and does not limit the scope of the present disclosure.

Referring to FIG. 15, it is assumed that the transmitting apparatus and/or the receiving apparatus are operated based on Methods 1 to 3 and/or the embodiments described above.

The transmitting apparatus may sequentially apply rotation to a plurality of reference signals (S1510). The plurality of reference signals may correspond to symbols (for example, reference signals) known to both the transmitting apparatus and the receiving apparatus. For example, the plurality of reference signals may be rotated at regular intervals based on an arbitrary reference signal to constitute the plurality of reference signals. When transmitting and receiving a K-bit signal, the transmitting apparatus may continuously and sequentially transmit a reference signal rotated in a unit of $\pi/2^{K-1}$. Alternatively, the transmitting apparatus may apply rotation such that a change of one bit has a maximum distance. Alternatively, the transmitting apparatus may apply the same phase rotation to the plurality of reference signals.

The transmitting apparatus may apply rotation based on the first transmitted reference signal. Alternatively, rotation may be applied based on an arbitrary reference signal irrespective of the transmission order. Alternatively, the transmitting apparatus may inform the receiving apparatus in advance about which signal to rotate based on.

The transmitting apparatus may continuously transmit the plurality of rotated reference signals to the receiving apparatus (S1520). Here, the order of the plurality of rotated reference signals may be irrelevant.

The receiving apparatus may receive the rotated plurality of reference signals, and sort the range of the channel phase based on this (S1530). The range of the channel phase may have a different sorting interval according to the number of bits of a signal to be transmitted/received. For example, the receiving apparatus may sort the range of the channel phase corresponding to the total of $2^K$ channel phases from $P_1$ to $P_{2^K}$ according to the position where the received reference signal is displayed on the constellation map. The range of the channel phase may be sorted according to how much the phase rotation of the received signal received from the receiving apparatus compared to the reference signal transmitted from the transmitting apparatus is. In other words, the range of the channel phase may be sorted according to how much the phase rotation of the plurality of reference signals is received compared to the original signal.

The receiving apparatus may group the phase ranges of the channels (S1540). For example, when the range of channel phases corresponding to the total of $2^K$ is sorted, it may be grouped into $2^{K-2}$ groups. Each group may be constituted by ranges of a channel phase according to Equation 6 described above. One group may constitute ranges of 4 channel phases.

The transmitting apparatus may transmit a data signal to the receiving apparatus (S1550). The data signal may correspond to a signal of 3 bits or more, and may be a signal modulated according to a spatially aggregated phase modulation scheme. For example, a phase rotation may be applied to a symbol to be transmitted and transmitted. In this case, the phase rotation may be applied at an interval corresponding to a rotation phase unit of the reference signal.

Thereafter, the receiving apparatus may receive the data signal from the transmitting apparatus and perform decoding based on the SAPM basis (S1560). For example, the decoding may be performed based on selecting and combining the channel phase ranges one by one from each group grouped in step S1540.

Figure 16:
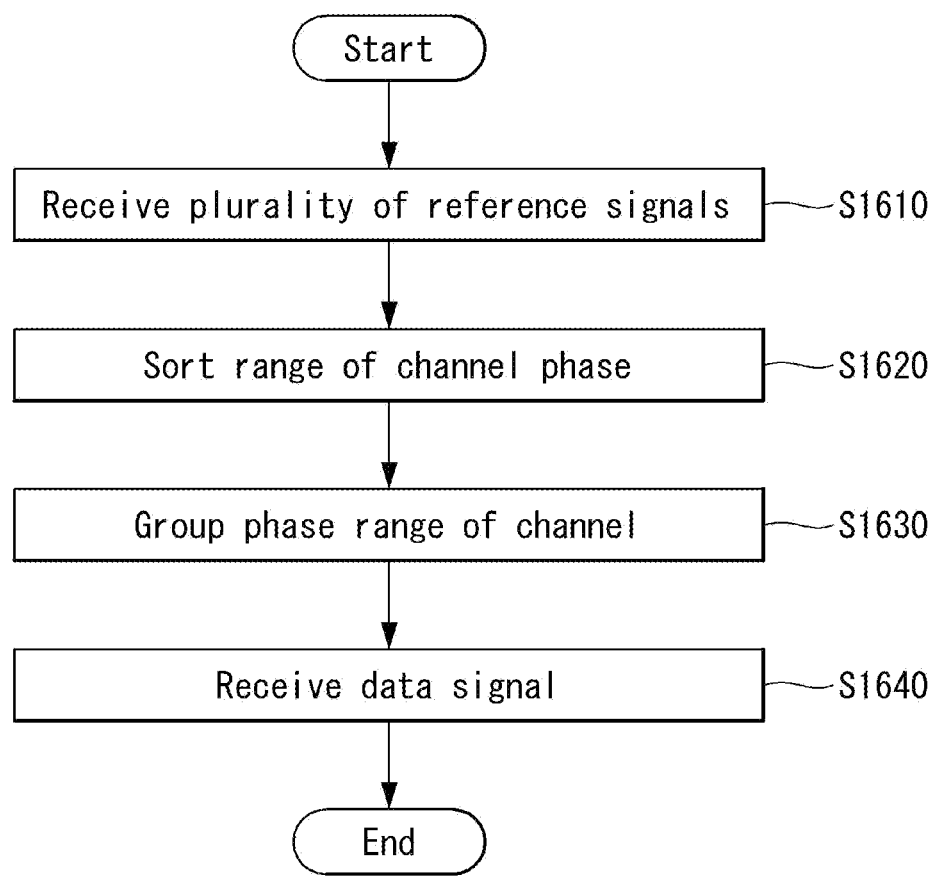
FIG. 16 illustrates an example of an operation flowchart of the device for transmitting and receiving the signal based on the 1-bit quantization to which the method and embodiment proposed in the present disclosure may be applied.

FIG. 16 illustrates an example of an operation flowchart of the apparatus for transmitting and receiving the signal based on 1-bit quantization to which the method and embodiment proposed in the present disclosure may be applied. FIG. 16 is only for convenience of description, and does not limit the scope of the present disclosure.

Referring to FIG. 16, it is assumed that the transmitting apparatus and/or receiving apparatus are operated based on Methods 1 to 3 and/or the embodiments described above.

The receiving apparatus may continuously receive a plurality of reference signals from the transmitting apparatus (S1610). The plurality of reference signals may correspond to symbols (for example, reference signals) known to both the transmitting apparatus and the receiving apparatus.

In this case, rotation may be sequentially applied to the plurality of reference signals. For example, the plurality of reference signals may be configured by rotating at regular intervals based on an arbitrary reference signal. The constant interval may be related to the number of bits of a signal to be transmitted and received. When a 3-bit signal is transmitted/received, a reference signal rotated in a unit of $\pi/4$ may be transmitted. When a 4-bit signal is transmitted/received, a reference signal rotated in a unit of $\pi/8$ may be transmitted. In the case of transmitting and receiving a K-bit signal, the reference signal rotated in a unit of $$\frac{\pi}{2^{K-1}}$$

may be continuously and sequentially transmitted.

When the rotation is applied to the reference signal, the rotation may be applied based on the first transmitted reference signal. Alternatively, the rotation may be applied based on an arbitrary reference signal irrespective of the transmission order. Alternatively, the above arbitrary reference signal, which is the basis of rotation application, may be preset between the transmitting apparatus and the receiving apparatus.

The receiving apparatus may sort the range of the channel phase based on the plurality of reference signals (S1620). The range of the channel phase may have a different sorting interval according to the number of bits of a signal to be transmitted/received. For example, when a 3-bit signal is transmitted/received, it may be sorted in the range of 8 channel phases. When a 4-bit signal is transmitted/received, it may be sorted in the range of 16 channel phases. The receiving apparatus may sort the range of the channel phase corresponding to the total of $c^{2^K}$ channel phases from $P_1$ to $P_{2^K}$ according to the position where the received reference signal is displayed on the constellation map. The range of the channel phase may be sorted according to how much the phase rotation of the received signal received from the receiving apparatus compared to the reference signal transmitted from the transmitting apparatus is. In other words, the range of the channel phase may be sorted according to how much the phase rotation of the plurality of reference signals is received compared to the original signal.

The receiving apparatus may group the phase ranges of the channels (S1630). For example, when the range of channel phases corresponding to the total of $2^K$ is sorted, it may be grouped into $2^{K-2}$ groups. Each group may be constituted by ranges of a channel phase according to Equation 6 described above. One group may constitute ranges of 4 channel phases.

The basis of the SAPM may be generated through Steps S1610 to S1630 described above.

The receiving apparatus may receive a data signal from the transmitting apparatus (S1640). For example, the data signal may correspond to a signal of 3 bits or more, and may be a signal modulated according to a spatially aggregated phase modulation scheme. In addition, the data signal may be rotated and modulated according to the phase of the interval such that the change (or the interval between bits) of one bit has the maximum distance according to the spatially aggregated phase modulation scheme.

Then, the receiving apparatus may perform decoding based on the basis of the SAPM. The decoding may be performed based on selecting and combining a channel phase range one by one in each group grouped in Step S1630. When a reception path corresponding to a specific group does not exist, the demodulation may not be possible. For example, when transmitting and receiving 4 bits, through the process of generating the basis of the SAPM, the first group G1={P1, P5, P9, P13}, the second group G2={P2, P6, P10, P14}, the third group G3={P3, P7, P11, P15}, and the fourth group G4={P4, P8, P12, P16} are grouped, and thus, four groups are generated. However, when there is no reception signal in the range of the channel phase corresponding to G4 among all the reception paths of the receiving apparatus, the signal modulated by the SAPM method may not be properly demodulated. Therefore, when this case occurs, the receiving apparatus may report to the transmitting apparatus later.

General Device to which Present Disclosure May Apply

Figure 17:
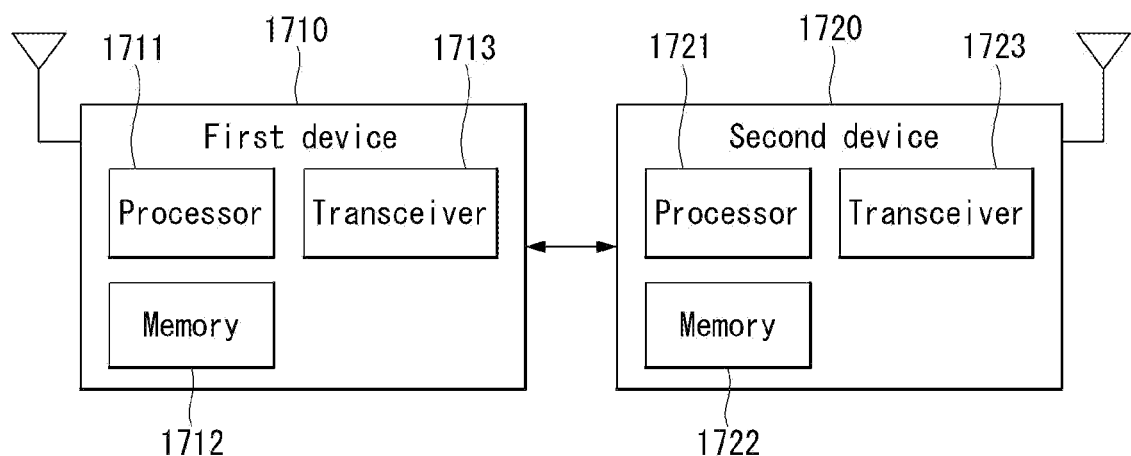
FIG. 17 illustrates a block diagram of a wireless communication device to which the methods proposed in the present disclosure may be applied.

FIG. 17 illustrates a block diagram of a wireless communication device to which the methods proposed in the present disclosure may be applied.

Referring to FIG. 17, the wireless communication system may include a first device 1710 and a second device 1720.

The first device 1710 may be a device related to a base station, a network node, a transmission terminal, a reception terminal, a transmitting apparatus, a receiving apparatus, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 1720 may be a device related to a base station, a network node, a transmission terminal, a reception terminal, a transmitting apparatus, a receiving apparatus, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistant (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 1710 may include at least one processor such as the processor 1711, at least one memory such as the memory 1712, and at least one transceiver such as the transceiver 1713. The processor 1711 may perform the above-described functions, procedures, and/or methods. The processor 1711 may perform one or more protocols. For example, the processor 1711 may perform one or more layers of a radio interface protocol. The memory 1712 is connected to the processor 1711, and may store various forms of information and/or instructions. The transceiver 1713 is connected to the processor 1711, and may be controlled to transmit and receive radio signals.

As a specific example, the processor 1711 may control the transceiver 1713 to continuously transmit a plurality of reference signals to the second device 1720 (S1520). Here, the plurality of reference signals may correspond to the symbols (for example, reference signals) known to both the transmitting apparatus and the receiving apparatus.

In this case, the rotation may be sequentially applied to the plurality of reference signals (s1510). For example, the plurality of reference signals may be configured by rotating at regular intervals based on an arbitrary reference signal. The regular interval may be related to the number of bits of a signal to be transmitted and received. When transmitting and receiving a K-bit signal, the reference signal rotated in a unit of $$\frac{\pi}{2^{K-1}}$$

may be continuously and sequentially transmitted. Alternatively, the regular interval may be set such that a change of one bit has a maximum distance.

When the rotation is applied to the reference signal, the rotation may be applied based on the first transmitted reference signal. Alternatively, the rotation may be applied based on an arbitrary reference signal irrespective of the transmission order. Alternatively, the arbitrary reference signal, which is the basis of rotation application, may be preset between the transmitting apparatus and the receiving apparatus.

Moreover, the processor 1711 may control the transceiver 1713 to transmit a data signal to the second device 1720 (S1550). The data signal may correspond to a signal of 3 bits or more, and may be a signal modulated according to a spatially aggregated phase modulation scheme. As an example, a data signal may be transmitted through modulation and encoding by applying the rotation to the phase of the symbol in a unit of $$\frac{\pi}{2^{K-1}}.$$

The second device 1720 may include at least one processor such as a processor 1721, at least one piece of memory device such as memory 1722, and at least one transceiver such as a transceiver 1723. The processor 1721 may perform the above-described functions, procedures and/or methods. The processor 1721 may implement one or more protocols. For example, the processor 1721 may implement one or more layers of a radio interface protocol. The memory 1722 is connected to the processor 1721, and may store various forms of information and/or instructions. The transceiver 1723 is connected to the processor 1721 and may be controlled transmit and receive radio signals.

As a specific example, the processor 1721 may receive the plurality of reference signals from the first device 1710 by controlling the transceiver 1723, and may sort a range of a channel phase based on the received plurality of reference signals (S1530). The range of the channel phase may have a different sorting interval according to the number of bits of a signal to be transmitted/received. For example, the receiving apparatus may sort the range of the channel phase corresponding to the total of $2^K$ channel phases from $P_1$ to $P_{2^K}$ according to the position where the received reference signal is displayed on the constellation map.

Moreover, the processor 1721 may group the phase ranges of the channels (S1540). For example, when the range of channel phases corresponding to the total of $2^K$ is sorted, it may be grouped into $2^{K-2}$ groups.

The processor 1721 may control the transceiver 1723 to receive a data signal from the first device 1710 (S1550), and perform decoding based on the SAPM basis (S1560). For example, the data signal may correspond to a signal of 3 bits or more, and may be a signal modulated according to a spatially aggregated phase modulation scheme. The decoding may be performed based on selecting and combining a channel phase range one by one in each group grouped on the basis of SAPM. When the reception path corresponding to a specific group does not exist, the demodulation may not be possible. In this case, the processor 1721 may control the transceiver 1723 to report it to the second device.

Figure 18:
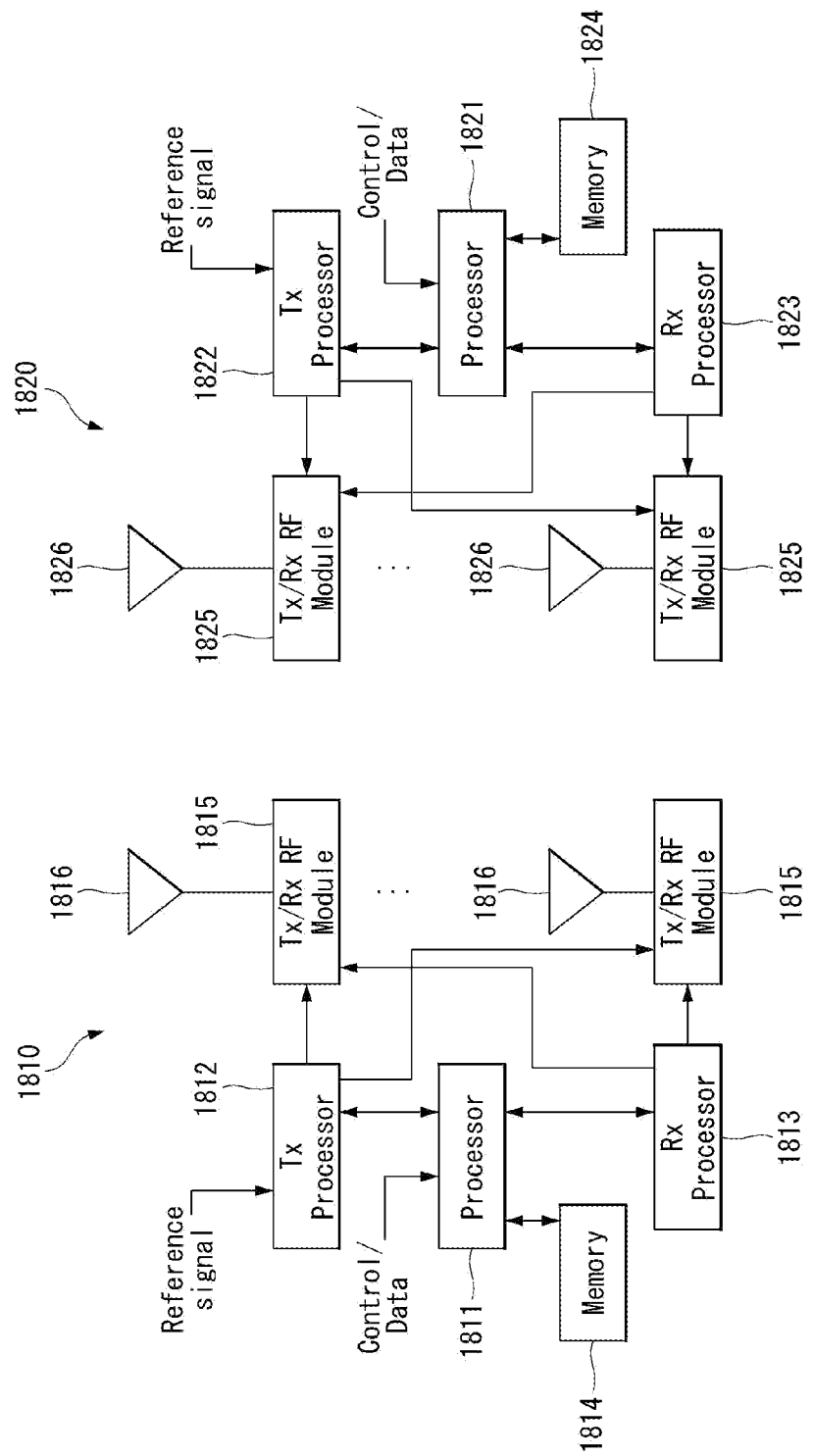
FIG. 18 is another example of a block diagram of a wireless communication device to which the methods proposed in the present disclosure may be applied.

FIG. 18 is another example of a block diagram of a wireless communication device to which the methods proposed in the present disclosure may be applied.

Referring to FIG. 18, a wireless communication system includes a base station 1810 and multiple UEs 1820 disposed within the base station region. The base station may be represented as a transmission device, and the UE may be represented as a reception device, and vice versa. The base station and the UE include processors 1811 and 1821, memories 1814 and 1824, one or more Tx/Rx radio frequency (RF) modules 1815 and 1825, Tx processors 1812 and 1822, Rx processors 1813 and 1823, and antennas 1816 and 1826, respectively. The processor implements the above-described functions, processes and/or methods. More specifically, in DL (communication from the base station to the UE), a higher layer packet from a core network is provided to the processor 1811. The processor implements the function of the L2 layer. In DL, the processor provides the UE 1820 with multiplexing between a logical channel and a transport channel and radio resource allocation, and is responsible for signaling toward the UE. The TX processor 1812 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 1816 through an individual Tx/Rx module (or transmitter and receiver 1815). Each Tx/Rx module may modulate an RF carrier into each space stream for transmission. In the UE, each Tx/Rx module (or transmitter and receiver 1825) receives a signal through each antenna 1826 of each Tx/Rx module. Each Tx/Rx module restores information modulated in an RF carrier and provides it to the RX processor 1823. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1821.

UL (communication from the UE to the base station) is processed by the base station 1810 in a manner similar to that described in relation to the receiver function in the UE 1820. Each Tx/Rx module 1825 receives a signal through each antenna 1826. Each Tx/Rx module provides an RF carrier and information to the RX processor 1823. The processor 1821 may be related to the memory 1824 storing a program code and data. The memory may be referred to as a computer-readable medium.

Figure 19:
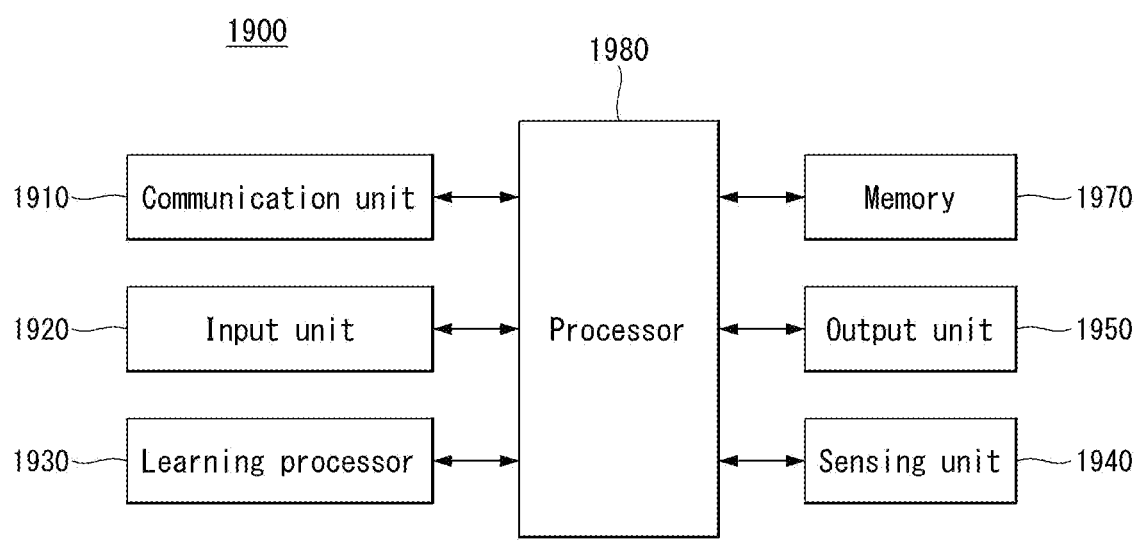
FIG. 19 illustrates an AI device 1900 according to an embodiment of the present disclosure.

FIG. 19 illustrates an AI device 1900 according to an embodiment of the present disclosure.

The AI device 1900 may be implemented as a fixed device or mobile device, such as TV, a projector, a mobile phone, a smartphone, a desktop computer, a notebook, a terminal for digital broadcasting, a personal digital assistant (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 19, the AI device 1900 may include a communication unit 1910, an input unit 1920, a learning processor 1930, a sensing unit 1940, an output unit 1950, a memory 1970, and a processor 1980.

Figure 21:
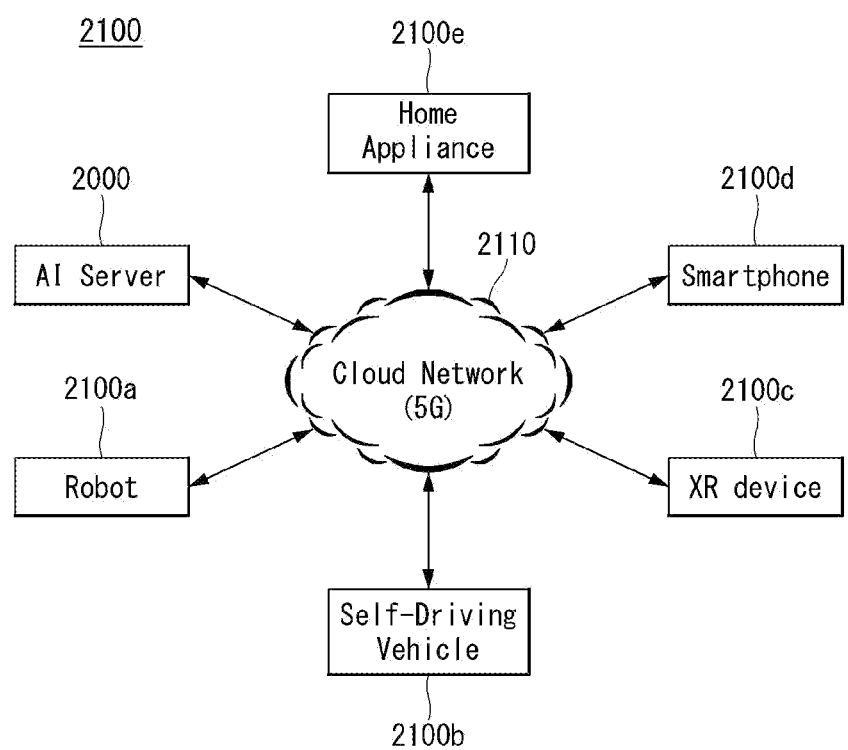
FIG. 21 illustrates an AI system 2100 according to an embodiment of the present disclosure.

The communication unit 1910 may transmit and receive data to and from external devices, such as other AI devices 2100a to 2100e or an AI server 2000 in FIG. 21, using wired and wireless communication technologies. For example, the communication unit 1910 may transmit and receive sensor information, a user input, a learning model, and a control signal to and from the external devices.

Examples of communication technologies used by the communication unit 1910 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 1920 may obtain various types of data.

The input unit 1920 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 1920 can obtain learning data for model learning and input data to be used when an output is obtained using a learning model. The input unit 1920 can obtain not-processed input data. In this case, the processor 1980 or the learning processor 1930 can extract an input feature by performing pre-processing on the input data.

The learning processor 1930 may be trained by a model constructed by an artificial neural network using learning data. In this case, the trained artificial neural network may be called a learning model. The learning model may be used to deduce a result value of new input data not learning data, and the deduced value may be used as a base for performing a given operation.

Figure 20:
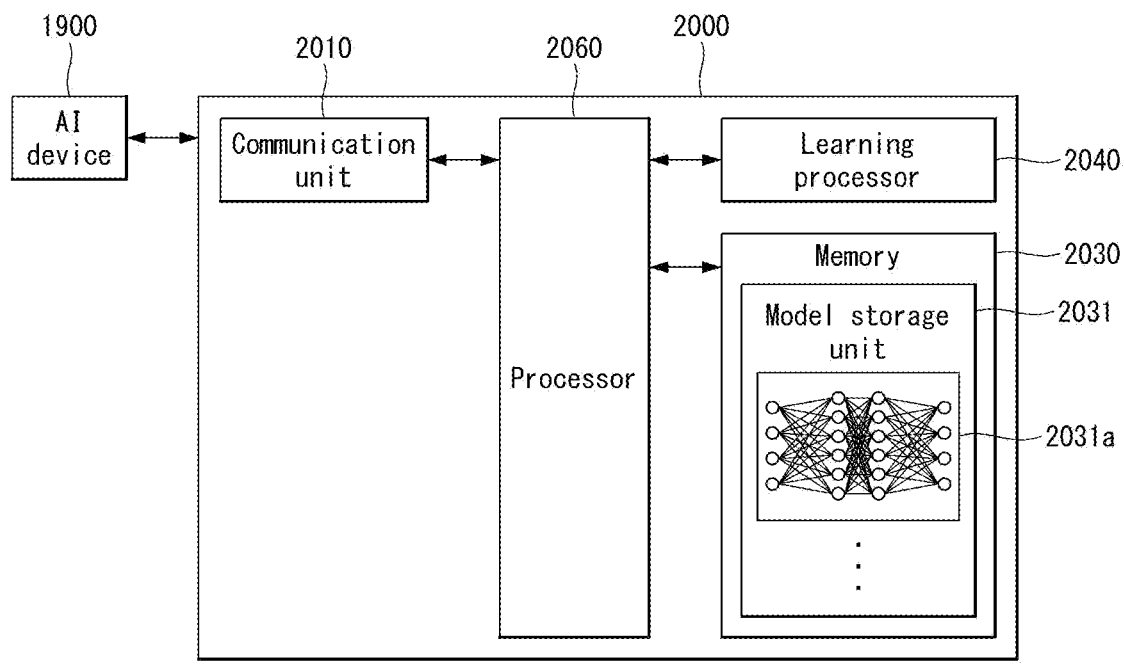
FIG. 20 illustrates an AI server 2000 according to an embodiment of the present disclosure.

The learning processor 1930 can perform AI processing along with a learning processor 2040 of the AI server 2000 in FIG. 20.

The learning processor 1930 may include a memory integrated or implemented in the AI device 1900. Alternatively, the learning processor 1930 may be implemented using the memory 1970, an external memory directly coupled to the AI device 1900, or a memory maintained in an external device.

The sensing unit 1940 can obtain at least one of internal information of the AI device 1900, surrounding environment information of the AI device 1900, or user information using various sensors.

Examples of sensors included in the sensing unit 1940 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 1950 can generate an output related to a visual sense, an auditory sense or a tactile sense.

The output unit 1950 may include a display for outputting visual information, a speaker for outputting auditory information, and a haptic module for outputting tactile information.

The memory 1970 can store data supporting various functions of the AI device 1900. For example, the memory 1970 can store input data obtained by the input unit 1920, learning data, a learning model, a learning history, etc.

The processor 1980 can determine at least one executable operation of the AI device 1900 based on information that is determined or generated using a data analysis algorithm or a machine learning algorithm. Furthermore, the processor 1980 can perform operation determined by controlling the components of the AI device 1900.

To this end, the processor 1980 can request, search, receive, or utilize data of the learning processor 1930 or the memory 1970, and can control the components of the AI device 1900 to execute a predicted operation or an operation determined to be preferred, among the at least one executable operation.

In this case, if association with an external device is necessary to perform the determined operation, the processor 1980 may generate a control signal for controlling the corresponding external device and transmit the generated control signal to the corresponding external device.

The processor 1980 can obtain intention information for a user input and transmit user requirements based on the obtained intention information.

The processor 1980 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 1930, may have been trained by the learning processor 2040 of the AI server 2000, or may have been trained by distributed processing thereof.

The processor 1980 may collect history information including the feedback, etc. of the user for the operation contents or an operation of the AI device 1900, and may store the history information in the memory 1970 or the learning processor 1930 or may transmit the history information to an external device such as the AI server 2000 in FIG. 20. The collected history information may be used to update a learning model.

The processor 1980 may control at least some of the components of the AI device 1900 in order to run an application program stored in the memory 1970. Moreover, the processor 1980 may combine and operate two or more of the components included in the AI device 1900 in order to run the application program.

FIG. 20 illustrates an AI server 2000 according to an embodiment of the present disclosure.

Referring to FIG. 20, the AI server 2000 may refer to a device which is trained by an artificial neural network using a machine learning algorithm or which uses a trained artificial neural network. Herein, the AI server 2000 consists of a plurality of servers and may perform distributed processing and may be defined as a 5G network. Further, the AI server 2000 may be included as a partial configuration of the AI device 1900 and may perform at least a part of AI processing.

The AI server 2000 may include a communication unit 2010, a memory 2030, a learning processor 2040, and a processor 2060.

The communication unit 2010 may transmit and receive data to and from an external device such as the AI device 1900.

The memory 2030 may include a model storage unit 2031. The model storage unit 2031 may store a model (or artificial neural network 2031*a*) which is being trained or has been trained through the learning processor 2040.

The learning processor 2040 may train the artificial neural network 2031*a* using learning data. The learning model may be used in the state in which it has been mounted on the AI server 2000 of the artificial neural network, or may be mounted on an external device such as the AI device 1900 and used.

The learning model may be implemented as hardware, software or a combination of hardware and software. If a part or all of the learning model is implemented as software, one or more instructions constructing the learning model may be stored in the memory 2030.

The processor 2060 may deduce a result value of new input data using the learning model and generate a response or a control command based on the deduced result value.

FIG. 21 illustrates an AI system 2100 according to an embodiment of the present disclosure.

Referring to FIG. 21, in the AI system 2100, at least one of the AI server 2000, a robot 2100a, a self-driving vehicle 2100b, an XR device 2100c, a smartphone 2100d, or home appliance 2100e is connected to a cloud network 2110. The robot 2100a, the self-driving vehicle 2100b, the XR device 2100c, the smartphone 2100d or the home appliance 2100e to which the AI technology is applied may be called AI devices 2100a to 2100e.

The cloud network 2110 may constitute part of cloud computing infra or may mean a network present within cloud computing infra. The cloud network 2110 may be configured using the 3G network, the 4G or long term evolution (LTE) network, or the 5G network.

That is, the devices 2100a to 2100e and 2000 constituting the AI system 2100 may be interconnected over the cloud network 2110. In particular, the devices 2100a to 2100e and 2000 may communicate with each other through a base station, or may directly communicate with each other without the intervention of the base station.

The AI server 2000 may include a server for performing AI processing and a server for performing calculation on big data.

The AI server 2000 is connected to at least one of the robot 2100a, the self-driving vehicle 2100b, the XR device 2100c, the smartphone 2100d or the home appliance 2100e, that are AI devices constituting the AI system 2100, over the cloud network 2110, and may help at least part of the AI processing of the connected AI devices 2100a to 2100e.

The AI server 2000 can train an artificial neural network based on a machine learning algorithm in place of the AI devices 2100a to 2100e, and can directly store a learning model or transmit the learning model to the AI devices 2100a to 2100e.

The AI server 2000 can receive input data from the AI devices 2100a to 2100e, deduce a result value of the received input data using the learning model, generate a response or control command based on the deduced result value, and transmit the response or control command to the AI devices 2100a to 2100e.

Alternatively, the AI devices 2100a to 2100e can directly deduce a result value of input data using a learning model, and can generate a response or a control command based on the deduced result value.

Various implementations of the AI devices 2100a to 2100e to which the above-described technologies are applied are described below. Herein, the AI devices 2100a to 2100e illustrated in FIG. 21 may be considered as detailed implementations of the AI device 1900 illustrated in FIG. 19.

AI and Robot to which the Present Disclosure is Applicable

The AI technology is applied to the robot 2100a, and the robot 2100a may be implemented as a guidance robot, a transport robot, a cleaning robot, a wearable robot, an entertainment robot, a pet robot, an unmanned aerial robot, etc.

The robot 2100a may include a robot control module for controlling an operation. The robot control module may mean a software module or a chip in which a software module is implemented using hardware.

The robot 2100a may obtain status information of the robot 2100a, detect (recognize) a surrounding environment and an object, generate map data, determine a moving path and a running plan, determine a response to a user interaction, or determine an operation, using sensor information obtained from various types of sensors.

The robot 2100a may use sensor information obtained by at least one sensor of LIDAR, a radar, and a camera in order to determine the moving path and the running plan.

The robot 2100a may perform the above operations using a learning model consisting of at least one artificial neural network. For example, the robot 2100a may recognize a surrounding environment and an object using the learning model, and determine an operation using the recognized surrounding environment information or object information. Herein, the learning model may have been directly trained in the robot 2100a or may have been trained in an external device such as the AI server 2000.

The robot 2100a may directly generate results using the learning model and perform an operation, but may perform an operation by transmitting sensor information to an external device such as the AI server 2000 and receiving results generated in response to this.

The robot 2100a may determine the moving path and the running plan using at least one of map data, object information detected from sensor information, or object information obtained from the external device. The robot 2100a may run along the determined moving path and running plan by controlling the driver.

The map data may include object identification information for various objects disposed in the space in which the robot 2100a moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 2100a may perform an operation or run by controlling the driver based on a user's control/interaction. In this case, the robot 2100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 2100b, and the self-driving vehicle 2100b may be implemented as a mobile robot, a vehicle, an unmanned aerial vehicle, etc.

The self-driving vehicle 2100b may include a self-driving control module for controlling a self-driving function. The self-driving control module may mean a software module or a chip in which a software module has been implemented using hardware. The self-driving control module may be included in the self-driving vehicle 2100b as the component of the self-driving vehicle 2100b, but may be configured as separate hardware outside the self-driving vehicle 2100b and connected to the self-driving vehicle 2100b.

The self-driving vehicle 2100b may obtain status information of the self-driving vehicle 2100b, detect (recognize) a surrounding environment and object, generate map data, determine a moving path and a running plan, or determine an operation, using sensor information obtained from various types of sensors.

In order to determine the moving path and the running plan, the self-driving vehicle 2100b may use sensor information obtained from at least one sensor among LIDAR, a radar and a camera, in the same manner as the robot 2100a.

Particularly, the self-driving vehicle 2100b may recognize an environment or an object in an area in which a sight is blocked or an area of a predetermined distance or more by receiving sensor information from external devices, or may receive information that is directly recognized from the external devices.

The self-driving vehicle 2100b may perform the above operations using a learning model consisting of at least one artificial neural network. For example, the self-driving vehicle 2100b may recognize a surrounding environment and object using a learning model and determine a running path using the recognized surrounding environment information or object information. Herein, the learning model may have been directly trained in the self-driving vehicle 2100b or may have been trained in an external device such as the AI server 2000.

In this instance, the self-driving vehicle 2100b may directly generate results using the learning model to perform an operation, but may perform an operation by transmitting sensor information to an external device such as the AI server 2000 and receiving results generated in response to this.

The self-driving vehicle 2100b may determine a moving path and a running plan using at least one of map data, object information detected from sensor information, or object information obtained from an external device. The self-driving vehicle 2100b may run based on the determined moving path and running plan by controlling the driver.

The map data may include object identification information for various objects disposed in the space (e.g., road) on which the self-driving vehicle 2100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 2100b may perform an operation or run by controlling the driver based on a user's control/interaction. In this case, the self-driving vehicle 2100b may obtain intention information of an interaction according to a user' behavior or voice speaking, may determine a response based on the obtained intention information, and may perform an operation.

AI and XR to which the Present Disclosure is Applicable

The AI technology is applied to the XR device 2100c, and the XR device 2100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 2100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 2100c may output an XR object including additional information for a recognized object by making the XR object correspond to the corresponding recognized object.

The XR device 2100c may perform the above operations using a learning model consisting of at least one artificial neural network. For example, the XR device 2100c may recognize a real object in 3D point cloud data or image data using a learning model, and may provide information corresponding to the recognized real object. In this case, the learning model may have been directly trained in the XR device 2100c or may have been trained in an external device such as the AI server 2000.

In this instance, the XR device 2100c may directly generate results using a learning model and perform an operation, but may perform an operation by transmitting sensor information to an external device such as the AI server 2000 and receiving results generated in response to this.

AI, Robot and Self-Driving to which the Present Disclosure is Applicable

The AI technology and the self-driving technology are applied to the robot 2100a, and the robot 2100a may be implemented as a guidance robot, a transport robot, a cleaning robot, a wearable robot, an entertainment robot, a pet robot, an unmanned aerial robot, etc.

The robot 2100a to which the AI technology and the self-driving technology are applied may mean a robot itself having a self-driving function, or may mean the robot 2100a interacting with the self-driving vehicle 2100b.

The robot 2100a with the self-driving function may collectively refer to devices that move by itself along a given path without control of a user or determine by itself a moving path and move.

The robot 2100a with the self-driving function and the self-driving vehicle 2100b may use a common sensing method to determine one or more of a moving path or a running plan. For example, the robot 2100a with the self-driving function and the self-driving vehicle 2100b may determine one or more of a moving path or a running plan using information sensed through LIDAR, a radar, a camera, etc.

The robot 2100a interacting with the self-driving vehicle 2100b is present separately from the self-driving vehicle 2100b, and may perform an operation associated with a self-driving function inside or outside the self-driving vehicle 2100b or an operation associated with a user got in the self-driving vehicle 2100b.

In this case, the robot 2100a interacting with the self-driving vehicle 2100b may control or assist the self-driving function of the self-driving vehicle 2100b by obtaining sensor information in place of the self-driving vehicle 2100b and providing the sensor information to the self-driving vehicle 2100b, or by obtaining sensor information, generating surrounding environment information or object information, and providing the surrounding environment information or object information to the self-driving vehicle 2100b.

Alternatively, the robot 2100a interacting with the self-driving vehicle 2100b may control the function of the self-driving vehicle 2100b by monitoring whether a user got in the self-driving vehicle 2100b or through an interaction with a user. For example, if it is determined that a driver is in a drowsiness state, the robot 2100a may activate the self-driving function of the self-driving vehicle 2100b or assist control of a driving unit of the self-driving vehicle 2100b. Herein, the function of the self-driving vehicle 2100b controlled by the robot 2100a may include a function provided by a navigation system or audio system provided within the self-driving vehicle 2100b, in addition to a self-driving function simply.

Alternatively, the robot 2100a interacting with the self-driving vehicle 2100b may provide information to the self-driving vehicle 2100b or may assist a function outside the self-driving vehicle 2100b. For example, the robot 2100a may provide the self-driving vehicle 2100b with traffic information including signal information, etc., as in a smart traffic light, and may automatically connect an electric charger to a filling inlet through an interaction with the self-driving vehicle 2100*b* as in the automatic electric charger of an electric vehicle.

AI, Robot and XR to which the Present Disclosure is Applicable

The AI technology and the XR technology are applied to the robot 2100*a*, and the robot 2100*a* may be implemented as a guidance robot, a transport robot, a cleaning robot, a wearable robot, an entertainment robot, a pet robot, an unmanned aerial robot, a drone, etc.

The robot 2100*a* to which the XR technology is applied may mean a robot that is a target of control/interaction within an XR image. In this case, the robot 2100*a* is different from the XR device 2100*c*, and they may operate in conjunction with each other.

If the robot 2100*a* that is a target of control/interaction within the XR image obtains sensor information from sensors including a camera, the robot 2100*a* or the XR device 2100*c* may generate an XR image based on the sensor information, and the XR device 2100*c* may output the generated XR image. Furthermore, the robot 2100*a* may operate based on a control signal received through the XR device 2100*c* or a user's interaction.

For example, a user may identify a corresponding XR image at time of the robot 2100*a* remotely operating in conjunction through an external device such as the XR device 2100*c*, may adjust a self-driving path of the robot 2100*a* through an interaction, may control an operation or driving, or may identify information of a surrounding object.

AI, Self-Driving and XR to which the Present Disclosure is Applicable

The AI technology and the XR technology are applied to the self-driving vehicle 2100*b*, and the self-driving vehicle 2100*b* may be implemented as a mobile robot, a vehicle, an unmanned aerial vehicle, etc.

The self-driving vehicle 2100*b* to which the XR technology is applied may mean a self-driving vehicle provided with a means for providing an XR image or a self-driving vehicle that is a target of control/interaction within the XR image. Particularly, the self-driving vehicle 2100*b* that is the target of control/interaction within the XR image is different from the XR device 2100*c*, and they may operate in conjunction with each other.

The self-driving vehicle 2100*b* provided with the means for providing the XR image may obtain sensor information from sensors including a camera, and may output the XR image generated based on the obtained sensor information. For example, the self-driving vehicle 2100*b* includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 2100*b*, at least a part of the XR object may be output to overlap with an object within a screen. For example, the self-driving vehicle 2100*b* may output XR objects corresponding to objects, such as a carriageway, other vehicles, a traffic light, a signpost, a two-wheeled vehicle, a pedestrian, and a building.

If the self-driving vehicle 2100*b* that is a target of control/interaction within an XR image obtains sensor information from sensors including a camera, the self-driving vehicle 2100*b* or the XR device 2100*c* may create an XR image based on the sensor information, and the XR device 2100*c* may output the created XR image. Furthermore, the self-driving vehicle 2100*b* may operate based on a control signal received through an external device, such as the XR device 2100*c*, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the method of transmitting and receiving signals in the wireless communication system of the present disclosure has been mainly described as an example applied to the 3GPP LTE/LTE-A system and the 5G system (New RAT system), it is possible to apply it to various wireless communication systems in addition.

The invention claimed is:

1. A method for transmitting and receiving a signal by a receiving apparatus in a wireless communication system, the method comprising:
continuously receiving a plurality of reference signals from a transmitting apparatus;
sorting ranges of channel phases based on degrees of phase rotations of the plurality of reference signals received compared to a first received reference signal among the plurality of reference signals;

grouping the ranges of the channel phases into multiple groups, wherein a number of the multiple groups is based on a specific number of bits of data signal to be received;

generating a basis of spatially aggregated phase modulation (SAPM) as a combination of a range of a channel phase from each of the multiple groups;

receiving, from the transmitting apparatus, a data signal with the specific number of bits, wherein each of the bits of the data signal is phase rotated at an interval for a rotation phase unit of the plurality of reference signals; and decoding the data signal using the basis of the SAPM.

2. The method of claim 1, wherein the plurality of reference signals are configured by phase rotating the plurality of reference signals at regular intervals based on an arbitrary reference signal.

3. The method of claim 2, wherein the regular intervals are related to the number of bits of the data signal.

4. The method of claim 2, wherein the arbitrary reference signal is preset between the transmitting apparatus and the receiving apparatus.

5. The method of claim 1, wherein each group of the multiple groups include four ranges of the channel phases.

6. A receiving apparatus for transmitting and receiving a signal in a wireless communication system, the receiving apparatus comprising:

a transceiver; and a processor operably coupled to the transceiver, and configured to:

continuously receive a plurality of reference signals from a transmitting apparatus;

sort ranges of channel phases based on degrees of phase rotations of the plurality of reference signals received compared to a first received reference signal among the plurality of reference signals;

group the ranges of the channel phases into multiple groups, wherein a number of the multiple groups is based on a specific number of bits of data signal to be received;

generate a basis of spatially aggregated phase modulation (SAPM) as a combination of a range of a channel phase from each of the multiple groups;

receive, from the transmitting apparatus, a data signal with the specific number of bits, wherein each of the bits of the data signal is phase rotated at an interval for a rotation phase unit of the plurality of reference signals; and decode the data signal using the basis of the SAPM.

* * * * *